United States Patent
Hara

(10) Patent No.: US 8,032,730 B2
(45) Date of Patent: Oct. 4, 2011

(54) METHOD AND APPARATUS FOR I/O PRIORITY CONTROL IN STORAGE SYSTEMS

(75) Inventor: Junichi Hara, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 690 days.

(21) Appl. No.: 12/153,209

(22) Filed: May 15, 2008

(65) Prior Publication Data

US 2009/0287898 A1 Nov. 19, 2009

(51) Int. Cl.
*G06F 12/00* (2006.01)
(52) U.S. Cl. .................................. 711/170; 711/162
(58) Field of Classification Search .................. 711/170, 711/162
See application file for complete search history.

(56) References Cited

U.S. PATENT DOCUMENTS

| | | | |
|---|---|---|---|
| 6,779,083 | B2 | 8/2004 | Ito et al. |
| 6,865,617 | B2* | 3/2005 | Zeidner et al. ............... 710/3 |
| 7,181,607 | B2 | 2/2007 | Ido et al. |
| 2001/0054133 | A1* | 12/2001 | Murotani et al. ............ 711/114 |
| 2003/0220991 | A1 | 11/2003 | Soejima et al. |
| 2004/0054866 | A1 | 3/2004 | Blumenau et al. |
| 2005/0267986 | A1* | 12/2005 | Murakami et al. ............ 709/238 |
| 2006/0101213 | A1* | 5/2006 | Morita ........................ 711/162 |
| 2006/0230219 | A1 | 10/2006 | Njoku et al. |
| 2007/0050545 | A1* | 3/2007 | Tsuboki et al. ............... 711/114 |
| 2008/0294859 | A1* | 11/2008 | Nguyen ...................... 711/162 |

FOREIGN PATENT DOCUMENTS

EP 1 674 983 A1 6/2006

OTHER PUBLICATIONS

U.S. Appl. No. 11/826,717, filed Jul. 8, 2007.
U.S. Appl. No. 12/000,821, filed Dec. 18, 2007.
Fibre Channel Framing and Signaling-3 (FC-FS-3), Rev. 0.20 INCITS working draft proposed American National Standard for Information Technology, Jun. 29, 2007.

* cited by examiner

*Primary Examiner* — Hashem Farrokh
(74) *Attorney, Agent, or Firm* — Mattingly & Malur, P.C.

(57) ABSTRACT

In exemplary embodiments a storage control unit is able to provide and track priority control among virtual ports created for corresponding physical ports and/or volume groups made up of one or more volumes, and thereby ensure application of priority settings. According to exemplary embodiments, when a virtual port created for a physical port on a first storage control unit is transferred to another physical port, such as in the same storage control unit or on another storage control unit, priority settings on the first physical port and storage control unit are checked and transferred with the virtual port to the other physical port to prevent competition for priority by virtual ports at the destination physical port. Similarly, priority settings assigned to volume groups may also be transferred when a volume group is transferred to another physical port within a storage control unit or to a different storage control unit.

20 Claims, 29 Drawing Sheets

Explanatory Drawing of Port and
Volume Configuration of First Embodiments
Following Transfer of Volume Group

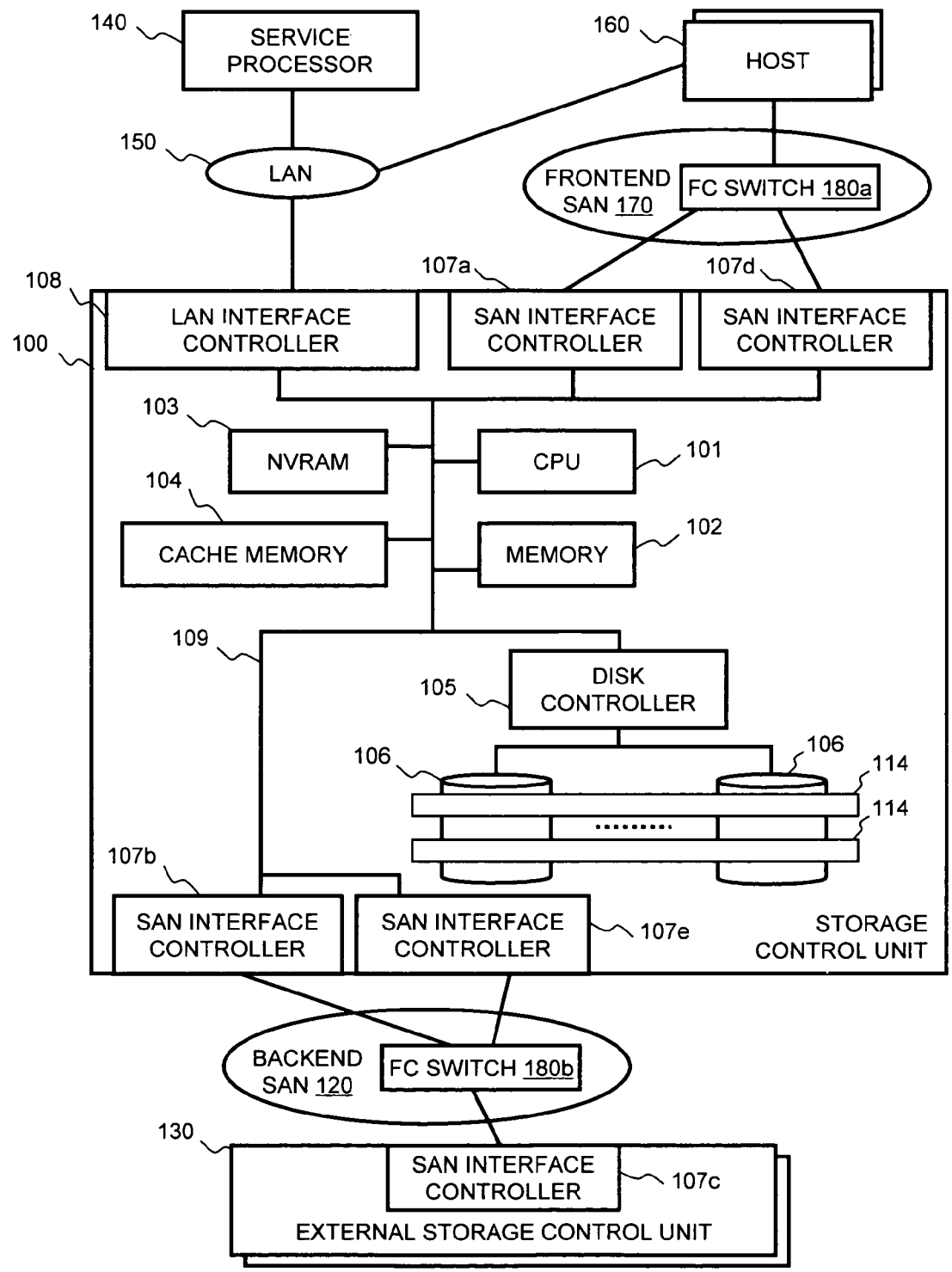
FIG. 1 Exemplary System Configuration of First Embodiments

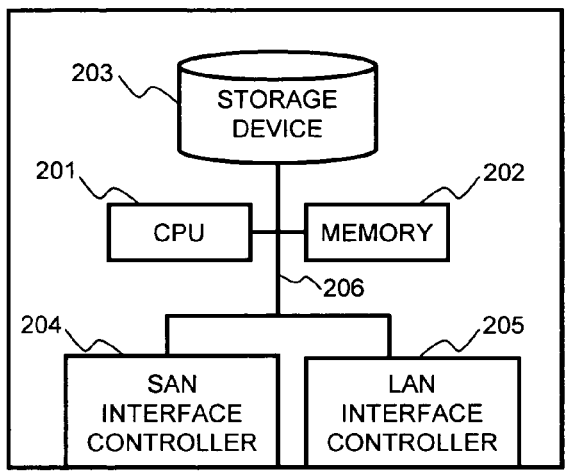
FIG. 2 Configuration of Host and Service Processor
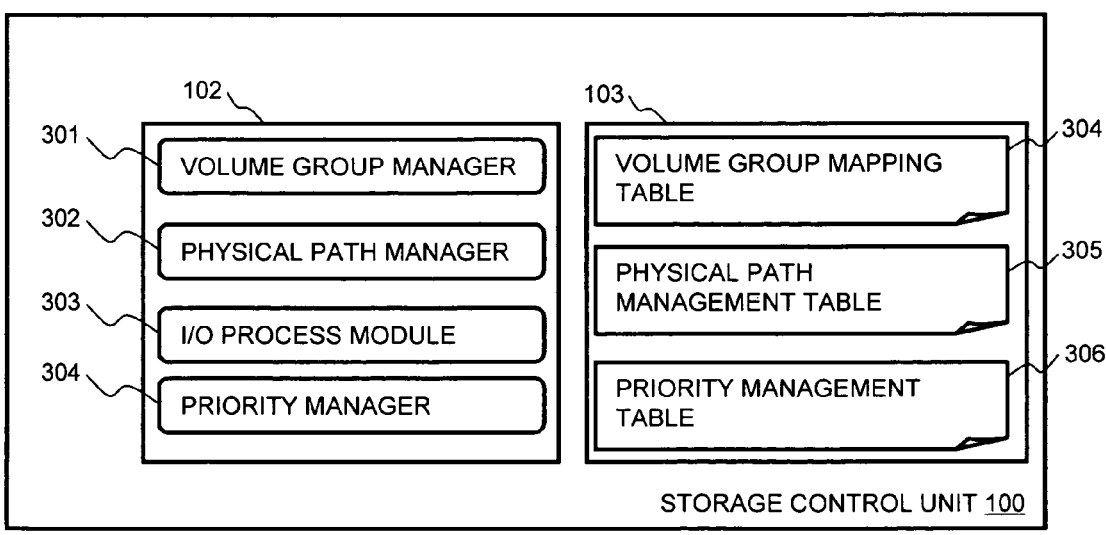
FIG. 3 Software Module Configuration on Storage Control Unit

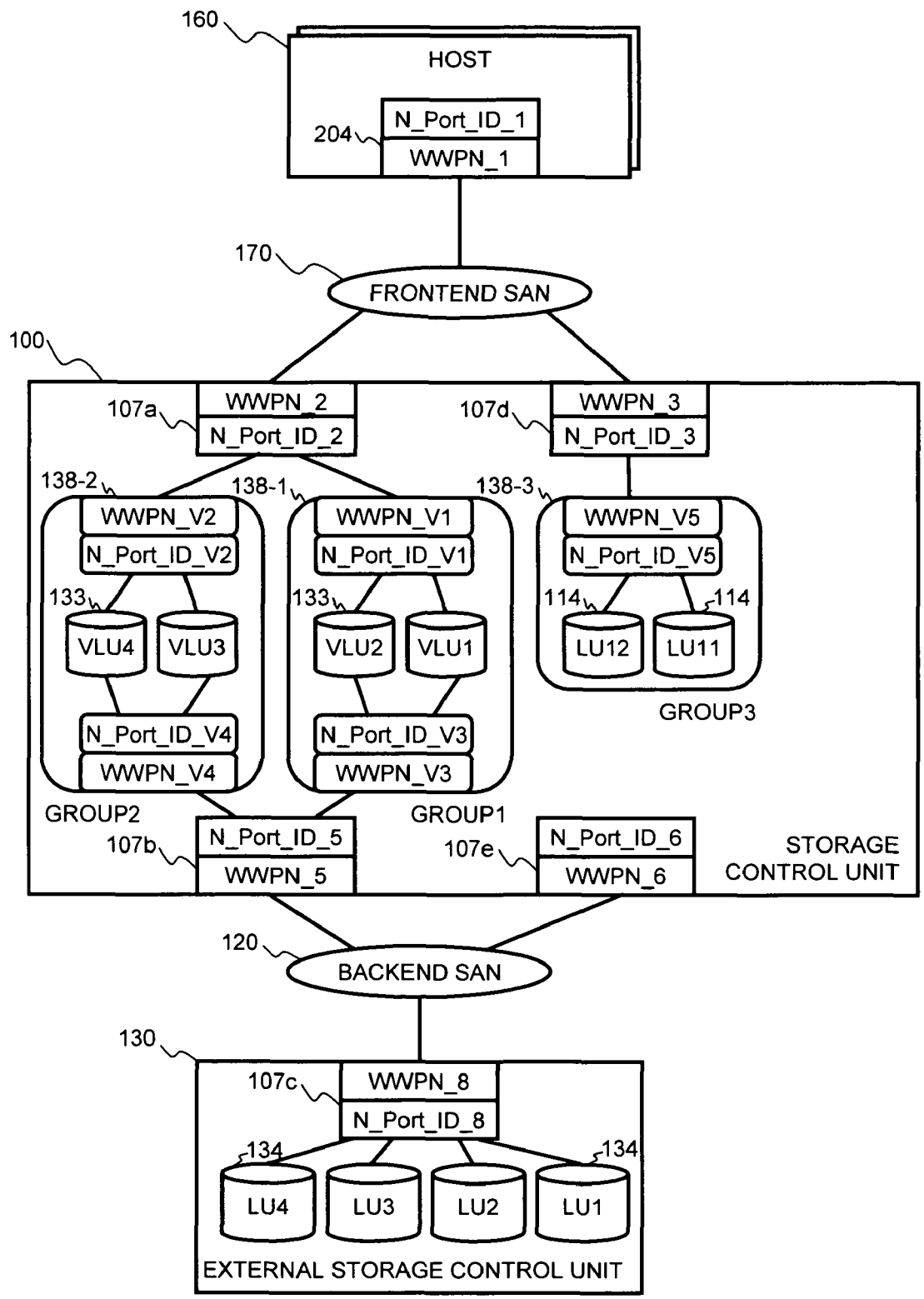
FIG. 4A Explanatory Drawing of Port and Volume Configuration of First Embodiments

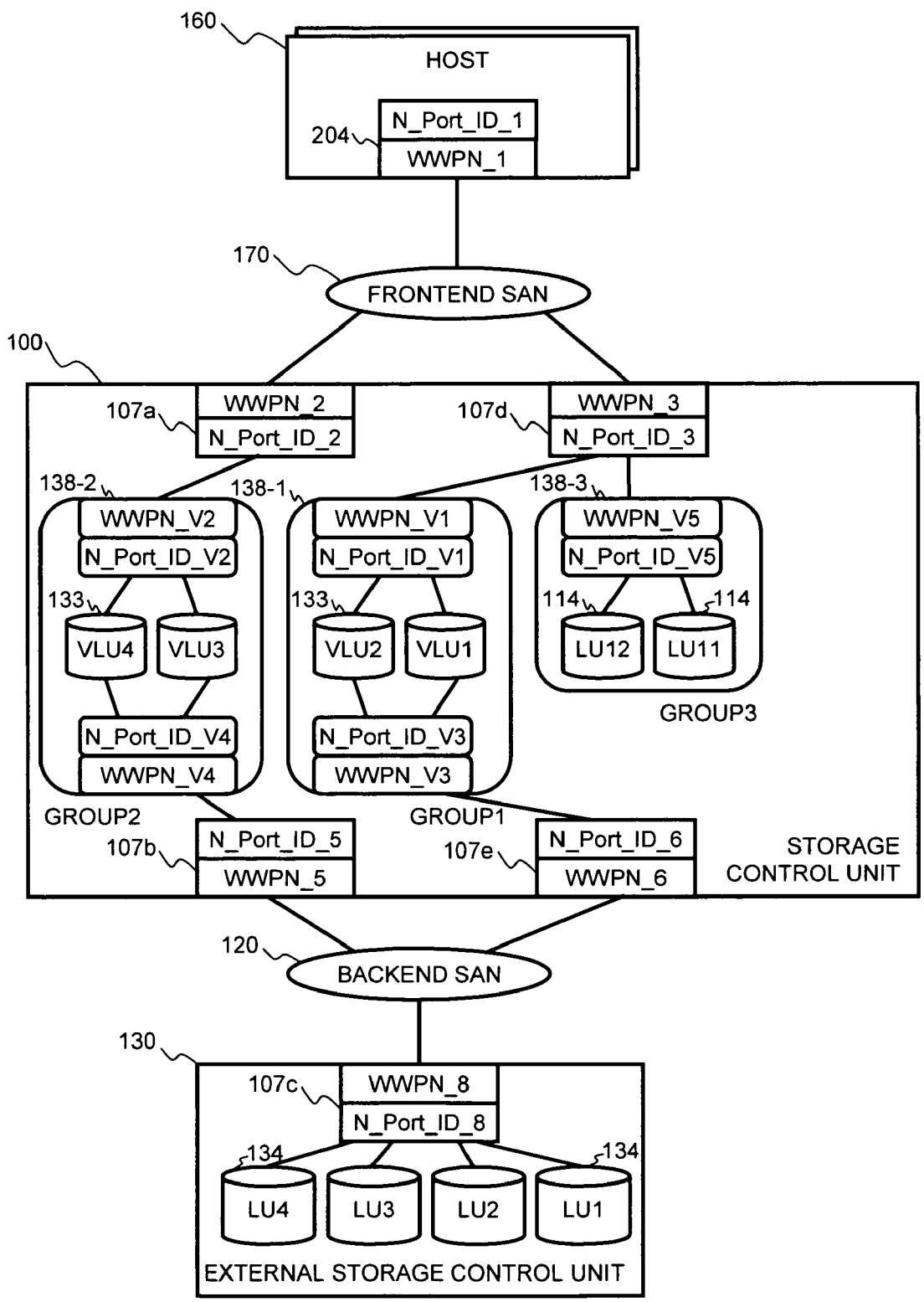
FIG. 4B Explanatory Drawing of Port and Volume Configuration of First Embodiments Following Transfer of Volume Group

| 501 | 502 | 503 | 504 | 505 | 506 | 507 | 508 | 509 | 510 | 511 |
|---|---|---|---|---|---|---|---|---|---|---|
| VOLUME GROUP | TARGET HOST N_PORT | EXPORTED VOLUME | EXTERNAL N_PORT | EXTERNAL VOLUME | FRONTEND VIRTUAL N_PORT | FRONTEND N_PORT_ID | BACKEND VIRTUAL N_PORT | BACKEND N_PORT_ID | CURRENT FRONTEND PHYSICAL N_PORT | CURRENT BACKEND PHYSICAL N_PORT |
| GROUP1 | WWPN_1 | VLU1, VLU2 | WWPN_8 | LU1, LU2 | WWPN_V1 | N_PORT_ID_V1 | WWPN_V3 | N_PORT_ID_V3 | WWPN_2 | WWPN_5 |
| GROUP2 | WWPN_1 | VLU3, VLU4 | WWPN_8 | LU3, LU4 | WWPN_V2 | N_PORT_ID_V2 | WWPN_V4 | N_PORT_ID_V4 | WWPN_2 | WWPN_5 |
| GROUP3 | WWPN_1 | LU11, LU12 | - | - | WWPN_V5 | N_PORT_ID_V5 | - | - | WWPN_3 | - |

FIG. 5 Example of Volume Group Mapping Table

| 601 | 602 | 603 |
|---|---|---|
| PHYSICAL N_PORT | STATUS | REACHABLE N_PORT |
| WWPN_2 | OK | WWPN_1 |
| WWPN_3 | OK | WWPN_1 |
| WWPN_5 | OK | WWPN_8 |
| WWPN_6 | OK | WWPN_8 |

FIG. 6 Example of Physical Path Management Table

306a

| VOLUME GROUP 701a | PRIORITY 702 | IOPS MEASURED VALUE (Ie) 703 | IOPS THRESHOLD (It) 704 | TARGET IOPS (Io) 705 | DELAY SETTING (St) 706 | DELAY TIMER (Dt) 707 | IOPS MAX (Iu) 708 | IOPS MIN (IL) 709 |
|---|---|---|---|---|---|---|---|---|
| GROUP1 | PRIORITY | | | | | | | |
| GROUP2 | NON-PRIORITY | | | | | | | |
| GROUP3 | PRIORITY | | | | | | | |

FIG. 7A Example of Priority Management Table (per Volume Group)

306b

| FRONTEND VIRTUAL N_PORT 701b | PRIORITY 702 | IOPS MEASURED VALUE (Ie) 703 | IOPS THRESHOLD (It) 704 | TARGET IOPS (Io) 705 | DELAY SETTING (St) 706 | DELAY TIMER (Dt) 707 | IOPS MAX (Iu) 708 | IOPS MIN (IL) 709 |
|---|---|---|---|---|---|---|---|---|
| WWPN_V1 | PRIORITY | | | | | | | |
| WWPN_V2 | NON-PRIORITY | | | | | | | |
| WWPN_V5 | PRIORITY | | | | | | | |

FIG. 7B Example of Priority Management Table (per Frontend Virtual N_Port)

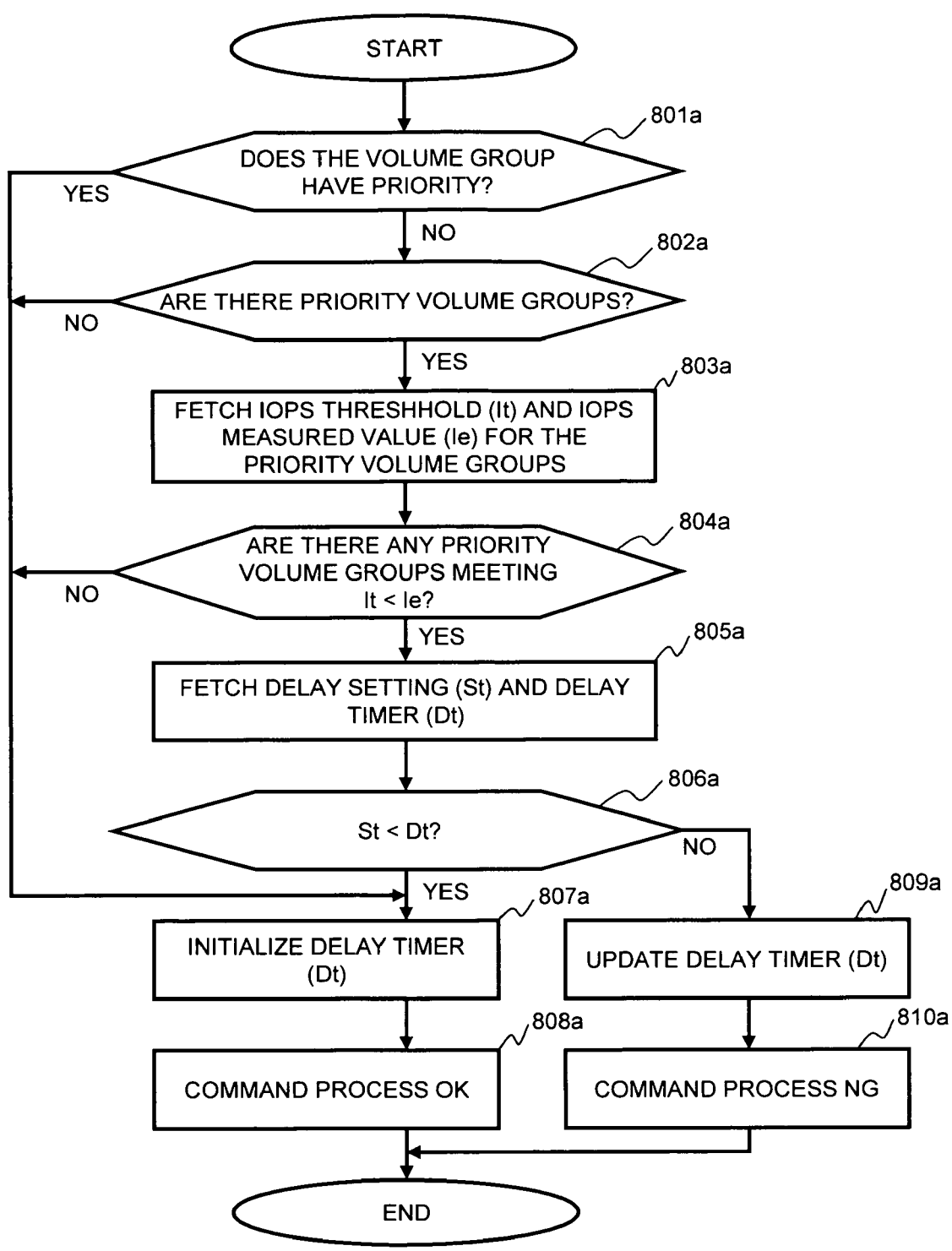
FIG. 8A Flowchart of Exemplary Process for Determining Whether I/O Process Should be Started According to Volume Group

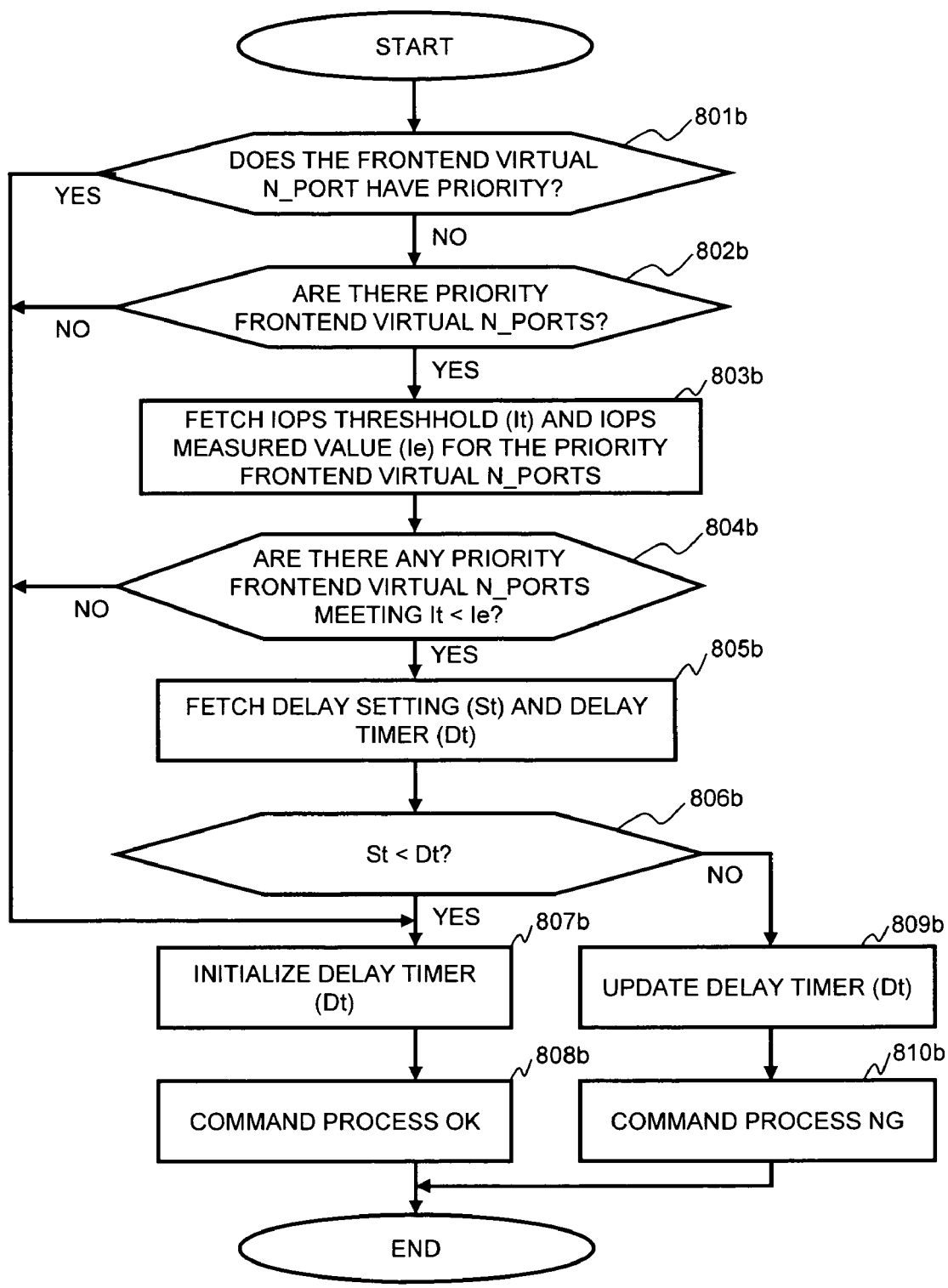
FIG. 8B Flowchart of Exemplary Process for Determining Whether I/O Process Should be Started According to N_Port

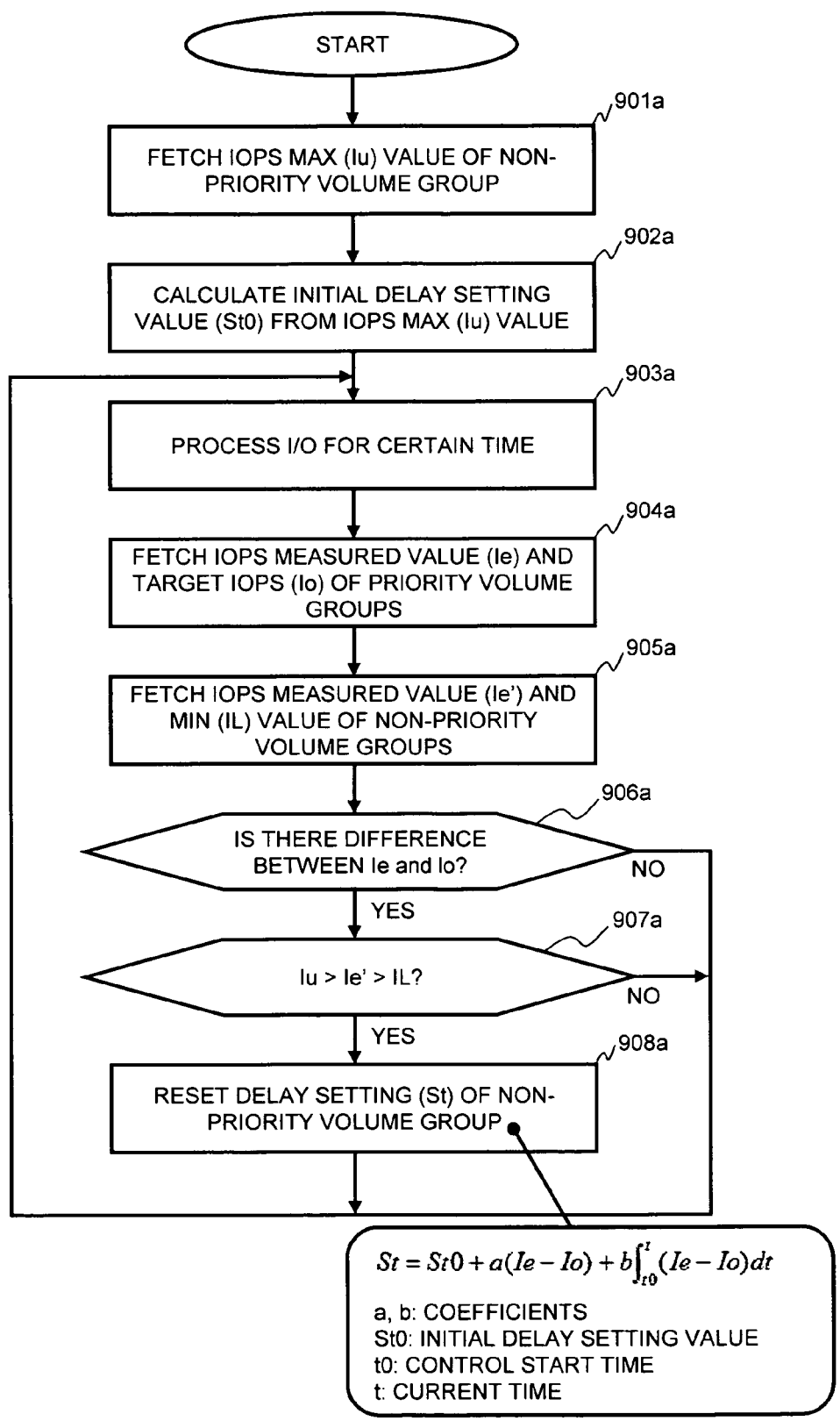
FIG. 9A Exemplary Flowchart of Adjusting Settings for Controlling I/O Processes

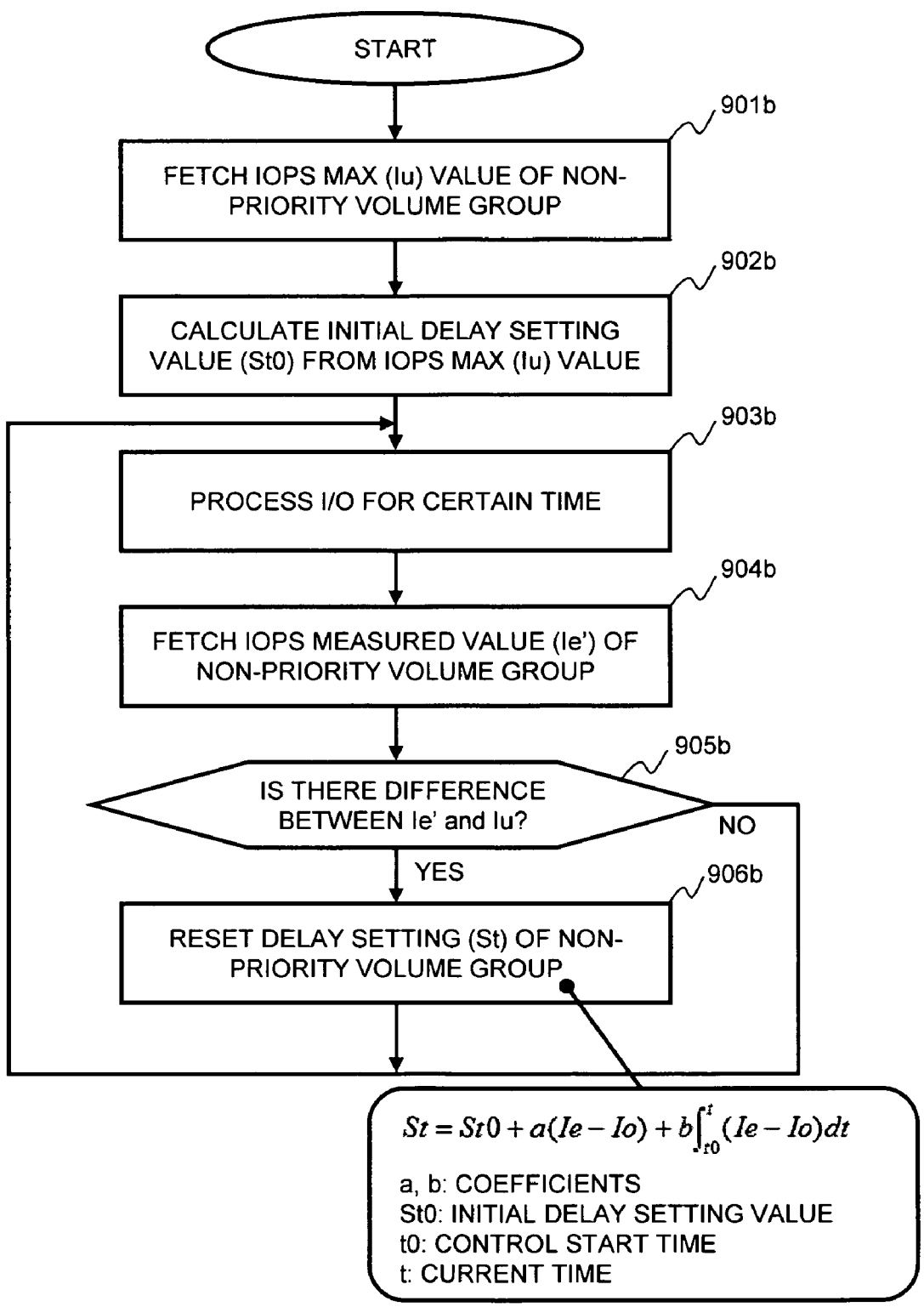
FIG. 9B Exemplary Flowchart of Adjusting Settings for Controlling I/O Processes

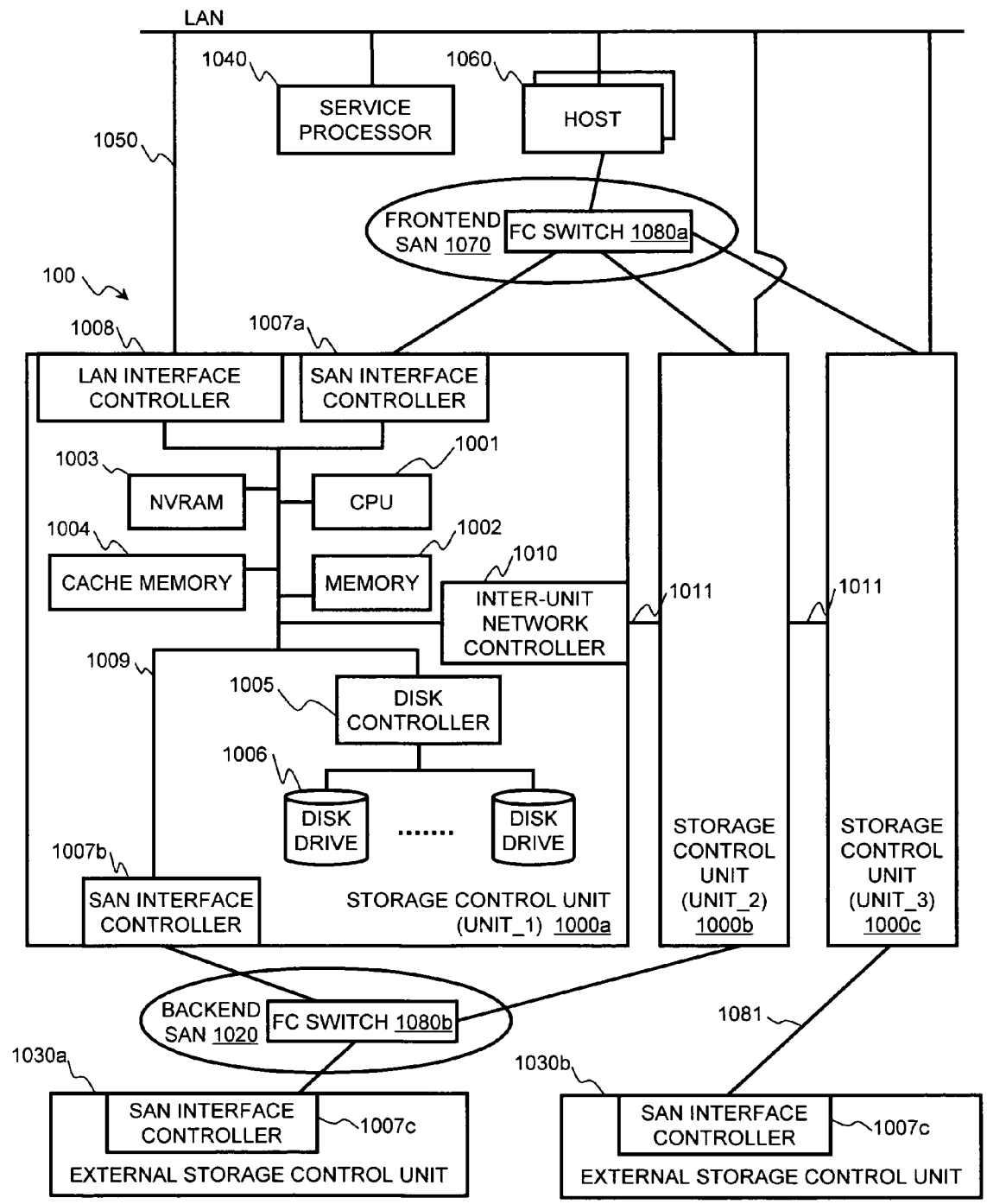
FIG. 10 Exemplary System Configuration of the Second Embodiments

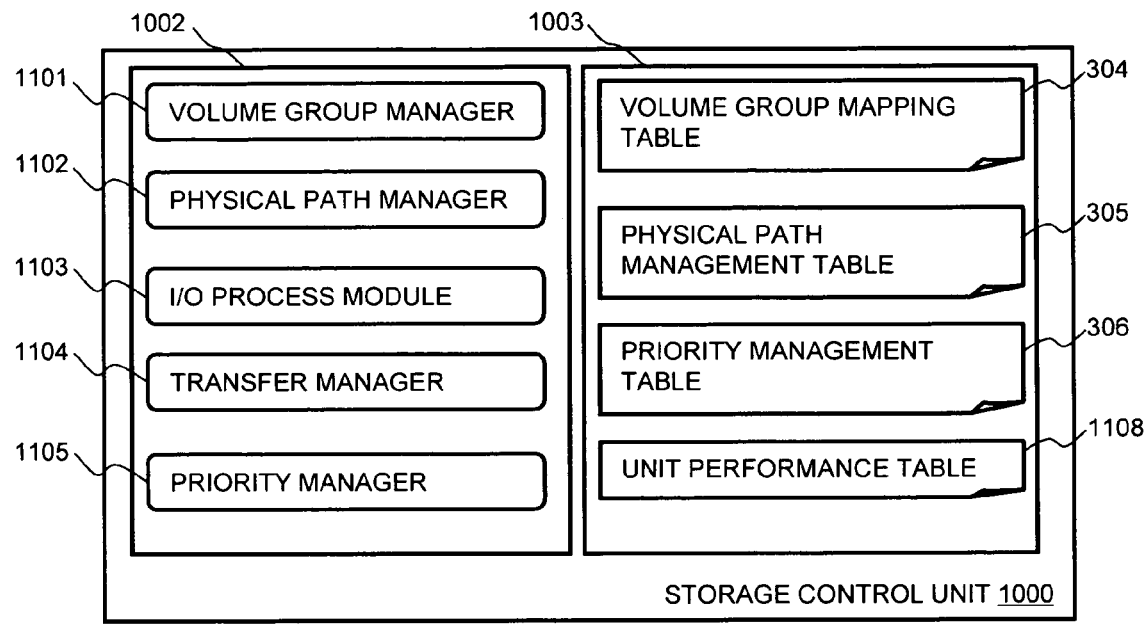
FIG. 11 Exemplary Software Module Configuration on Storage Controller
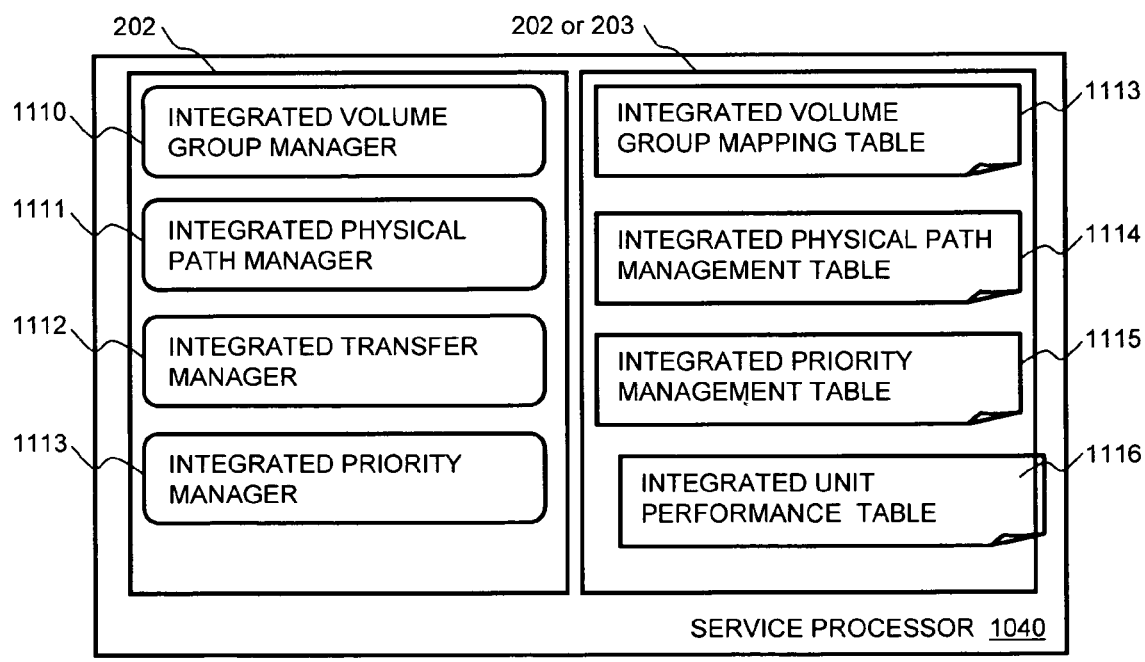
FIG. 12 Exemplary Software Module Configuration on Service Processor

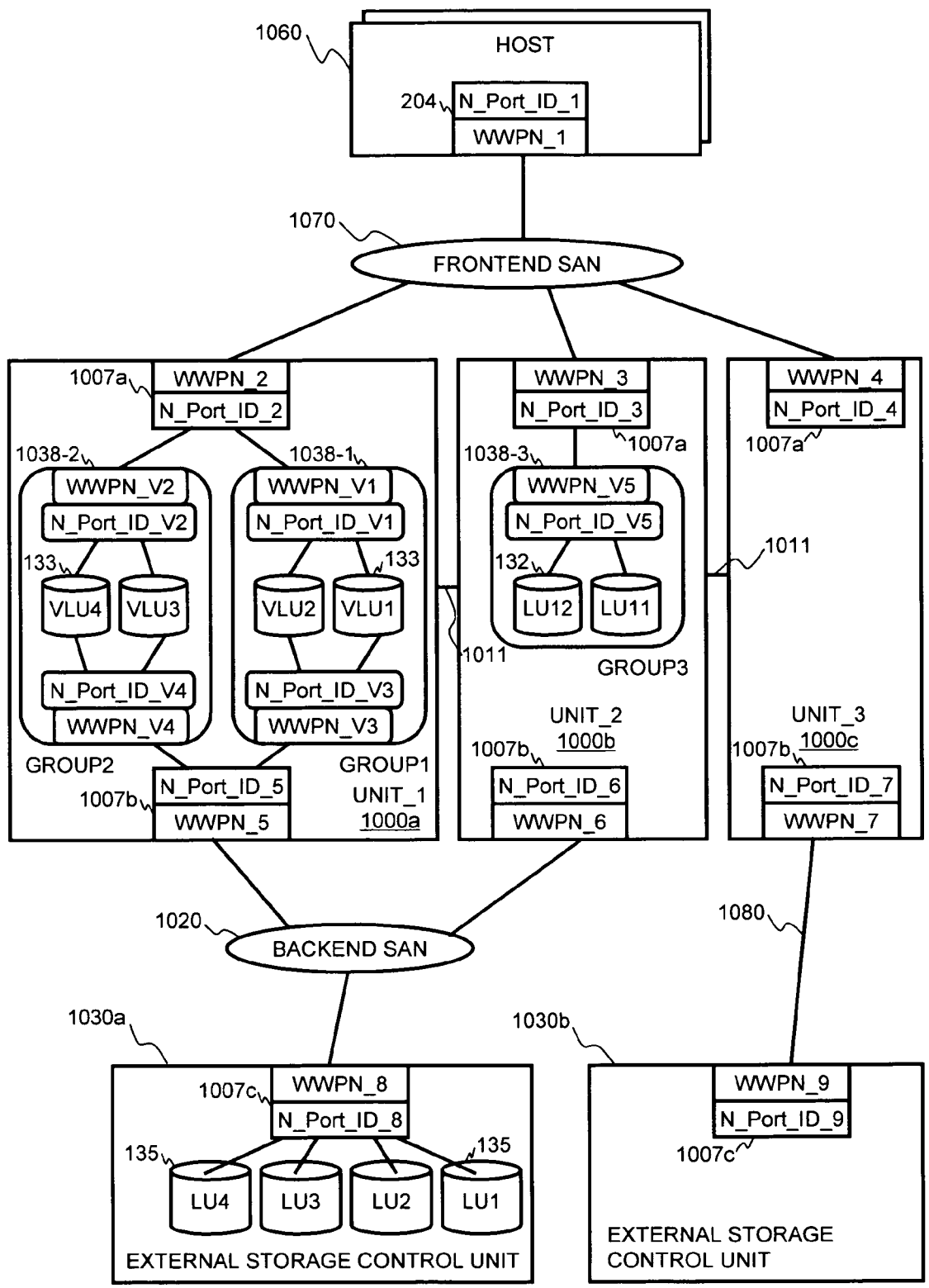
FIG. 13 Exemplary Port and Volume Configurations

FIG. 14A Example of Volume Group Mapping Table on Unit_1

304-1

| VOLUME GROUP 501 | TARGET HOST N_PORT 502 | EXPORTED VOLUME 503 | EXTERNAL N_PORT 504 | EXTERNAL VOLUME 505 | FRONTEND VIRTUAL N_PORT 506 | FRONTEND N_PORT_ID 507 | BACKEND VIRTUAL N_PORT 508 | BACKEND N_PORT_ID 509 | CURRENT FRONTEND PHYSICAL N_PORT 510 | CURRENT BACKEND PHYSICAL N_PORT 511 |
|---|---|---|---|---|---|---|---|---|---|---|
| GROUP1 | WWPN_1 | VLU1, VLU2 | WWPN_8 | LU1, LU2 | WWPN_V1 | N_PORT_ID_V1 | WWPN_V3 | N_PORT_ID_V3 | WWPN_2 | WWPN_5 |
| GROUP2 | WWPN_1 | VLU3, VLU4 | WWPN_8 | LU3, LU4 | WWPN_V2 | N_PORT_ID_V2 | WWPN_V4 | N_PORT_ID_V4 | WWPN_2 | WWPN_5 |

FIG. 14B Example of Volume Group Mapping Table on Unit_2

304-2

| VOLUME GROUP 501 | TARGET HOST N_PORT 502 | EXPORTED VOLUME 503 | EXTERNAL N_PORT 504 | EXTERNAL VOLUME 505 | FRONTEND VIRTUAL N_PORT 506 | FRONTEND N_PORT_ID 507 | BACKEND VIRTUAL N_PORT 508 | BACKEND N_PORT_ID 509 | CURRENT FRONTEND PHYSICAL N_PORT 510 | CURRENT BACKEND PHYSICAL N_PORT 511 |
|---|---|---|---|---|---|---|---|---|---|---|
| GROUP3 | WWPN_1 | LU11, LU12 | - | - | WWPN_V5 | N_PORT_ID_V5 | - | - | WWPN_3 | - |

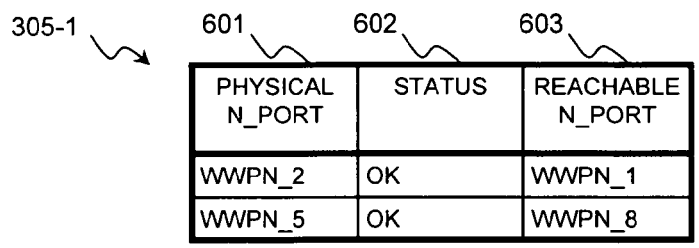
FIG. 15A Example of Physical Path Management Table on Unit_1
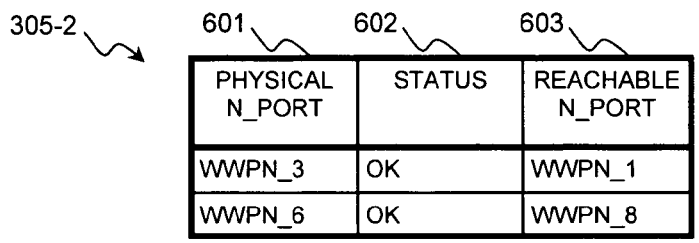
FIG. 15B Example of Physical Path Management Table on Unit_2
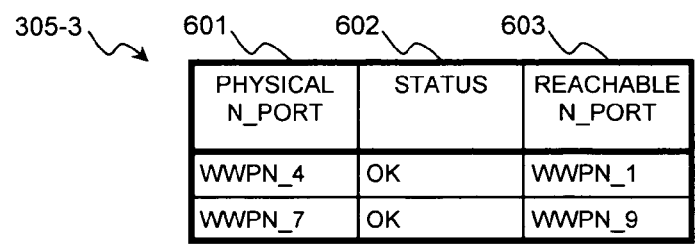
FIG. 15C Example of Physical Path Management Table on Unit_3

FIG. 16A Example of Priority Management Table on Unit_1 (Per Volume Group)

306a-1 →

| VOLUME GROUP /701a | PRIORITY /702 | IOPS MEASURED VALUE (Ie) /703 | IOPS THRESHOLD (It) /704 | TARGET IOPS (Io) /705 | DELAY SETTING (St) /706 | DELAY TIMER (Dt) /707 | IOPS MAX (Iu) /708 | IOPS MIN (IL) /709 |
|---|---|---|---|---|---|---|---|---|
| GROUP1 | PRIORITY | | | | | | | |
| GROUP2 | NON-PRIORITY | | | | | | | |

FIG. 16B Example of Priority Management Table on Unit_2 (Per Volume Group)

306a-2 →

| VOLUME GROUP /701a | PRIORITY /702 | IOPS MEASURED VALUE (Ie) /703 | IOPS THRESHOLD (It) /704 | TARGET IOPS (Io) /705 | DELAY SETTING (St) /706 | DELAY TIMER (Dt) /707 | IOPS MAX (Iu) /708 | IOPS MIN (IL) /709 |
|---|---|---|---|---|---|---|---|---|
| GROUP3 | PRIORITY | | | | | | | |

| FRONTEND VIRTUAL N_PORT | PRIORITY | IOPS MEASURED VALUE (Ie) | IOPS THRESHOLD (It) | TARGET IOPS (Io) | DELAY SETTING (St) | DELAY TIMER (Dt) | IOPS MAX (Iu) | IOPS MIN (IL) |
|---|---|---|---|---|---|---|---|---|
| WWPN_V1 | PRIORITY | | | | | | | |
| WWPN_V2 | NON-PRIORITY | | | | | | | |

FIG. 17A Example of Priority Management Table on Unit_1 (Per Frontend Virtual N_Port)

| FRONTEND VIRTUAL N_PORT | PRIORITY | IOPS MEASURED VALUE (Ie) | IOPS THRESHOLD (It) | TARGET IOPS (Io) | DELAY SETTING (St) | DELAY TIMER (Dt) | IOPS MAX (Iu) | IOPS MIN (IL) |
|---|---|---|---|---|---|---|---|---|
| WWPN_V5 | PRIORITY | | | | | | | |

FIG. 17B Example of Priority Management Table on Unit_2 (Per Frontend Virtual N_Port)

| VOLUME GROUP | TARGET HOST N_PORT | EXPORTED VOLUME | EXTERNAL N_PORT | EXTERNAL VOLUME | FRONTEND VIRTUAL N_PORT | FRONTEND N_PORT_ID | BACKEND VIRTUAL N_PORT | BACKEND N_PORT_ID | CURRENT FRONTEND PHYSICAL N_PORT | CURRENT BACKEND PHYSICAL N_PORT | CURRENT UNIT |
|---|---|---|---|---|---|---|---|---|---|---|---|
| 501 | 502 | 503 | 504 | 505 | 506 | 507 | 508 | 509 | 510 | 511 | 1801 |
| GROUP1 | WWPN_1 | VLU1, VLU2 | WWPN_8 | LU1, LU2 | WWPN_V1 | N_PORT_ID_V1 | WWPN_V3 | N_PORT_ID_V3 | WWPN_2 | WWPN_5 | UNIT_1 |
| GROUP2 | WWPN_1 | VLU3, VLU4 | WWPN_8 | LU3, LU4 | WWPN_V2 | N_PORT_ID_V2 | WWPN_V4 | N_PORT_ID_V4 | WWPN_2 | WWPN_5 | UNIT_1 |
| GROUP3 | WWPN_1 | LU11, LU12 | - | - | WWPN_V5 | N_PORT_ID_V5 | - | - | WWPN_3 | - | UNIT_2 |

FIG. 18 Example of Integrated Volume Group Mapping Table

| PHYSICAL N_PORT | STATUS | REACHABLE N_PORT | UNIT |
|---|---|---|---|
| 601 | 602 | 603 | 1901 |
| WWPN_2 | OK | WWPN_1 | UNIT_1 |
| WWPN_3 | OK | WWPN_1 | UNIT_2 |
| WWPN_4 | OK | WWPN_1 | UNIT_3 |
| WWPN_5 | OK | WWPN_8 | UNIT_1 |
| WWPN_6 | OK | WWPN_8 | UNIT_2 |
| WWPN_7 | OK | WWPN_9 | UNIT_3 |

FIG. 19 Example of Integrated Physical Path Management Table

| UNIT | VOLUME GROUP | PRIORITY | IOPS MEASURED VALUE (Ie) | IOPS THRESHOLD (It) | TARGET IOPS (Io) | DELAY SETTING (St) | DELAY TIMER (Dt) | IOPS MAX (Iu) | IOPS MIN (IL) |
|---|---|---|---|---|---|---|---|---|---|
| UNIT_1 | GROUP1 | PRIORITY | | | | | | | |
| UNIT_1 | GROUP2 | NON-PRIORITY | | | | | | | |
| UNIT_2 | GROUP3 | PRIORITY | | | | | | | |

FIG. 20A Example of Integrated Priority Management Table (Per Volume Group)

| UNIT | FRONTEND VIRTUAL N_PORT | PRIORITY | IOPS MEASURED VALUE (Ie) | IOPS THRESHOLD (It) | TARGET IOPS (Io) | DELAY SETTING (St) | DELAY TIMER (Dt) | IOPS MAX (Iu) | IOPS MIN (IL) |
|---|---|---|---|---|---|---|---|---|---|
| UNIT_1 | WWN_V1 | PRIORITY | | | | | | | |
| UNIT_1 | WWN_V2 | NON-PRIORITY | | | | | | | |
| UNIT_2 | WWN_V5 | NON-PRIORITY | | | | | | | |

FIG. 20B Example of Integrated Priority Management Table (Per Virtual N_Port)

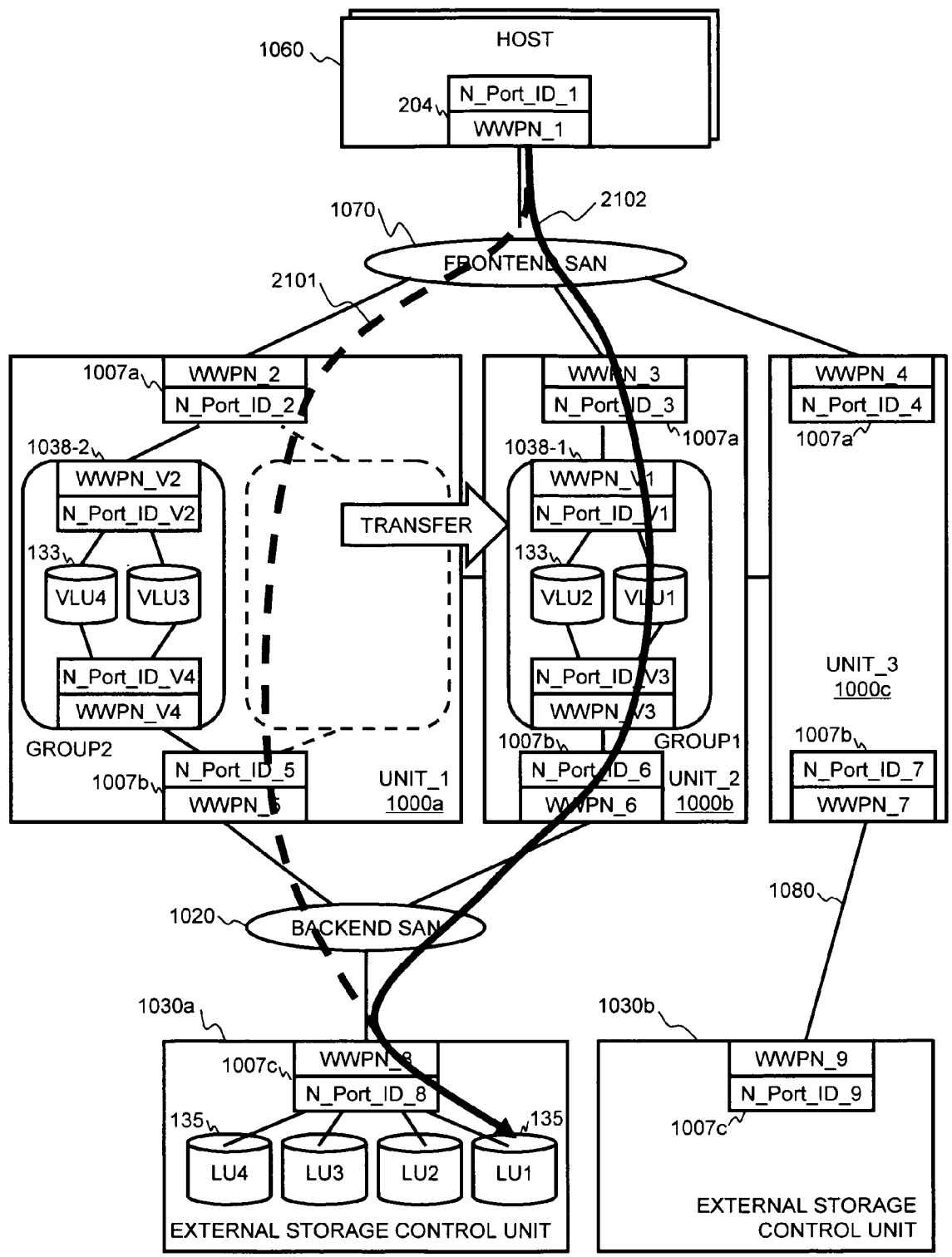
FIG. 21 Example of Transferring of a Volume Group

FIG. 22A Example of Unit Performance Management Table on Unit_1

1108-1 → 2201: MAX IOPS (Im) = 10000

FIG. 22B Example of Unit Performance Management Table on Unit_2

1108-2 → 2201: MAX IOPS (Im) = 5000

FIG. 22C Example of Unit Performance Management Table on Unit_3

1108-3 → 2201: MAX IOPS (Im) = 3000

1116 →

| UNIT (2301) | MAX IOPS (Im) (2201) |
|---|---|
| UNIT_1 | 10000 |
| UNIT_2 | 5000 |
| UNIT_3 | 3000 |

FIG. 23 Example of Integrated Unit Performance Management Table

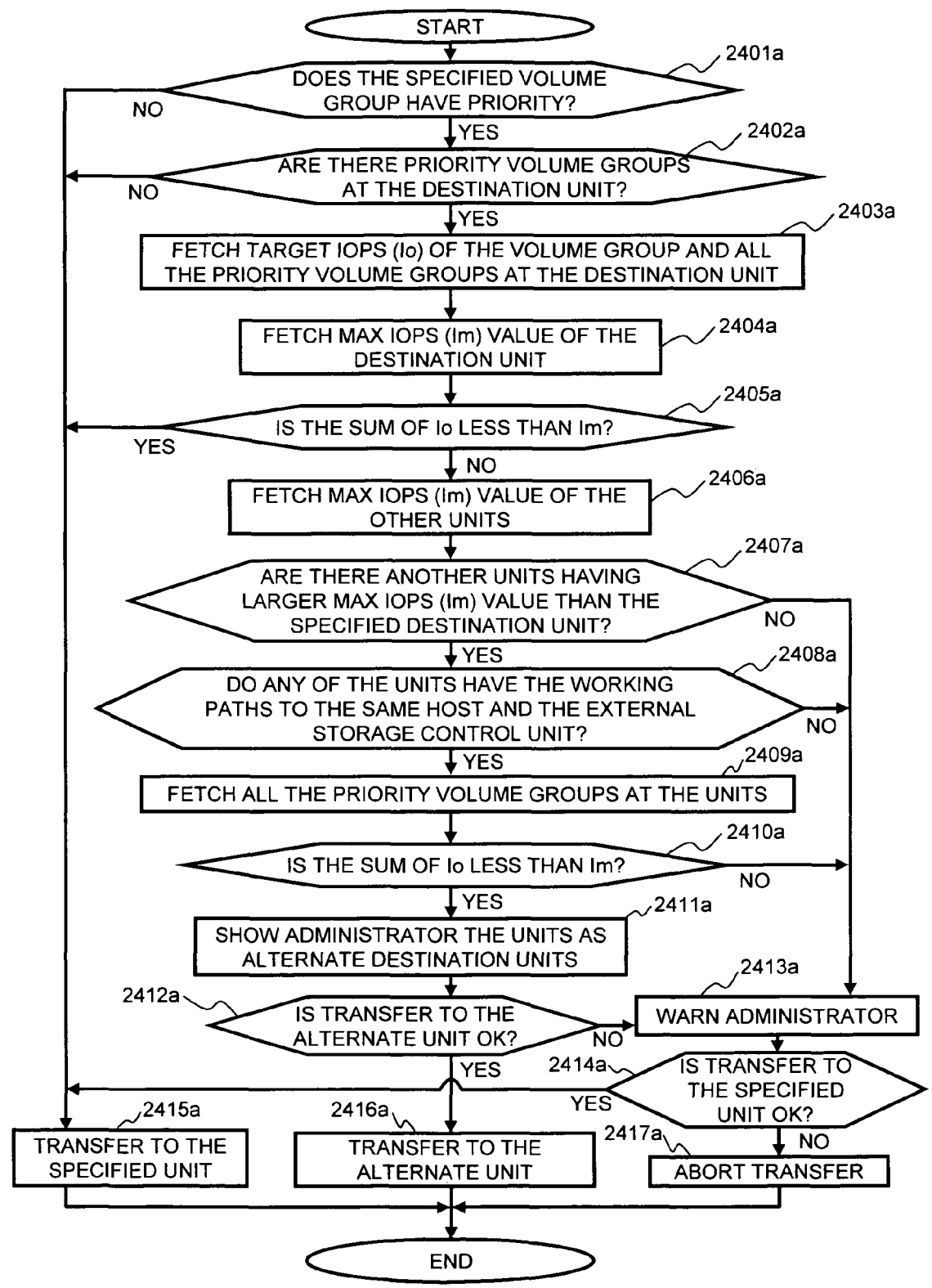
FIG. 24 Flowchart of Checking Priority Setting at Destination Unit at Transfer

| 306a-1 | VOLUME GROUP /701a | PRIORITY /702 | IOPS MEASURED VALUE (Ie) /703 | IOPS THRESHOLD (It) /704 | TARGET IOPS (Io) /705 | DELAY SETTING (St) /706 | DELAY TIMER (Dt) /707 | IOPS MAX (Iu) /708 | IOPS MIN (IL) /709 |
|---|---|---|---|---|---|---|---|---|---|
| | GROUP2 | NON-PRIORITY | | | | | | | |

FIG. 25A Example of Priority Management Table on Unit_1 (Per Volume Group) After Transfer

| 306a-2 | VOLUME GROUP /701a | PRIORITY /702 | IOPS MEASURED VALUE (Ie) /703 | IOPS THRESHOLD (It) /704 | TARGET IOPS (Io) /705 | DELAY SETTING (St) /706 | DELAY TIMER (Dt) /707 | IOPS MAX (Iu) /708 | IOPS MIN (IL) /709 |
|---|---|---|---|---|---|---|---|---|---|
| | GROUP3 | PRIORITY | | | | | | | |
| | GROUP1 | PRIORITY | | | | | | | |

FIG. 25B Example of Priority Management Table on Unit_2 (Per Volume Group) After Transfer

1115-1

| UNIT | VOLUME GROUP | PRIORITY | IOPS MEASURED VALUE (Ie) | IOPS THRESHOLD (It) | TARGET IOPS (Io) | DELAY SETTING (St) | DELAY TIMER (Dt) | IOPS MAX (Iu) | IOPS MIN (IL) |
|---|---|---|---|---|---|---|---|---|---|
| UNIT_2 | GROUP1 | PRIORITY | | | | | | | |
| UNIT_1 | GROUP2 | NON-PRIORITY | | | | | | | |
| UNIT_2 | GROUP3 | PRIORITY | | | | | | | |

FIG. 26 Example of Integrated Priority Management Table (Per Volume Group) After Transfer

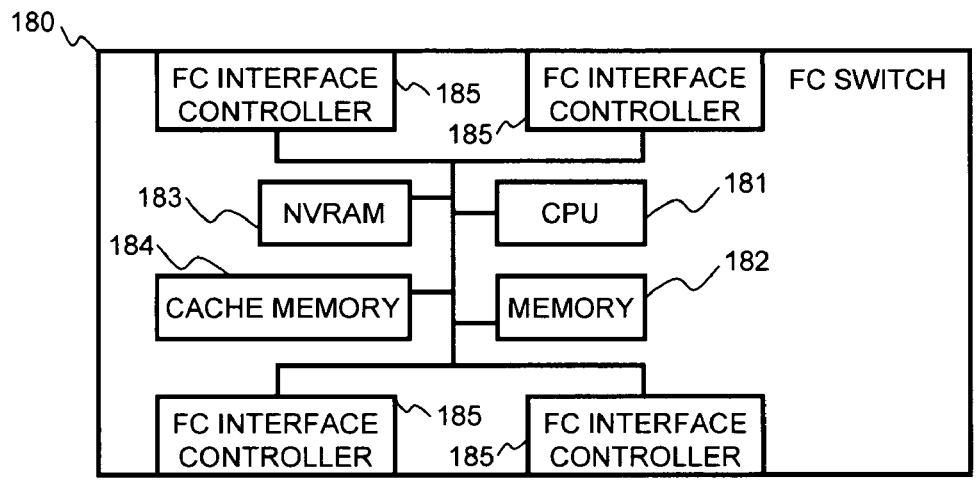
FIG. 27 Configuration of FC Switch
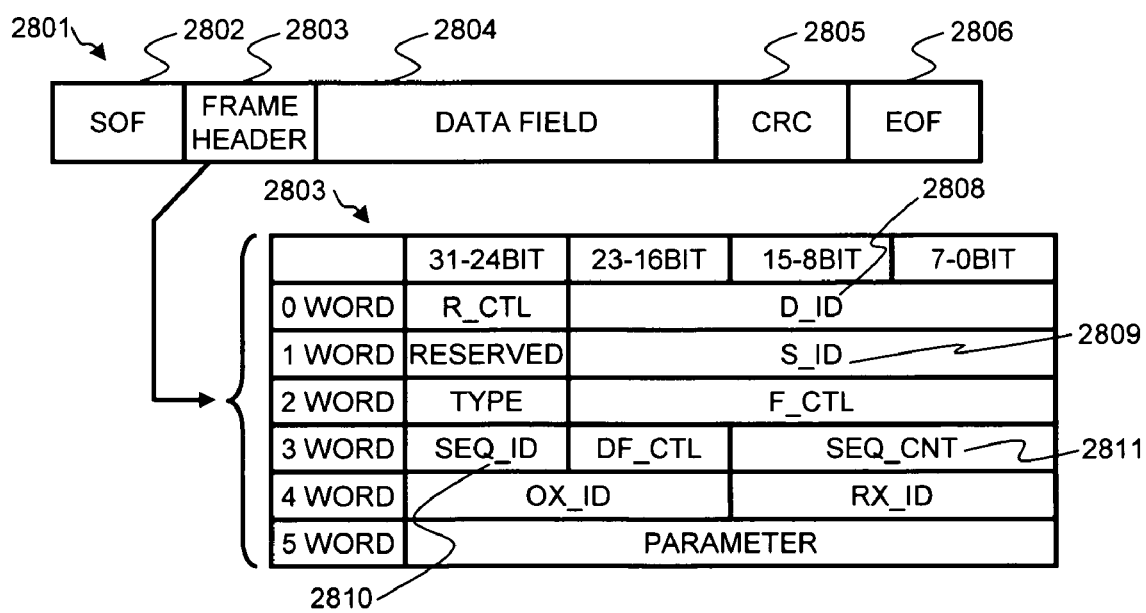
FIG. 28 Structure of a Frame (Related Art)

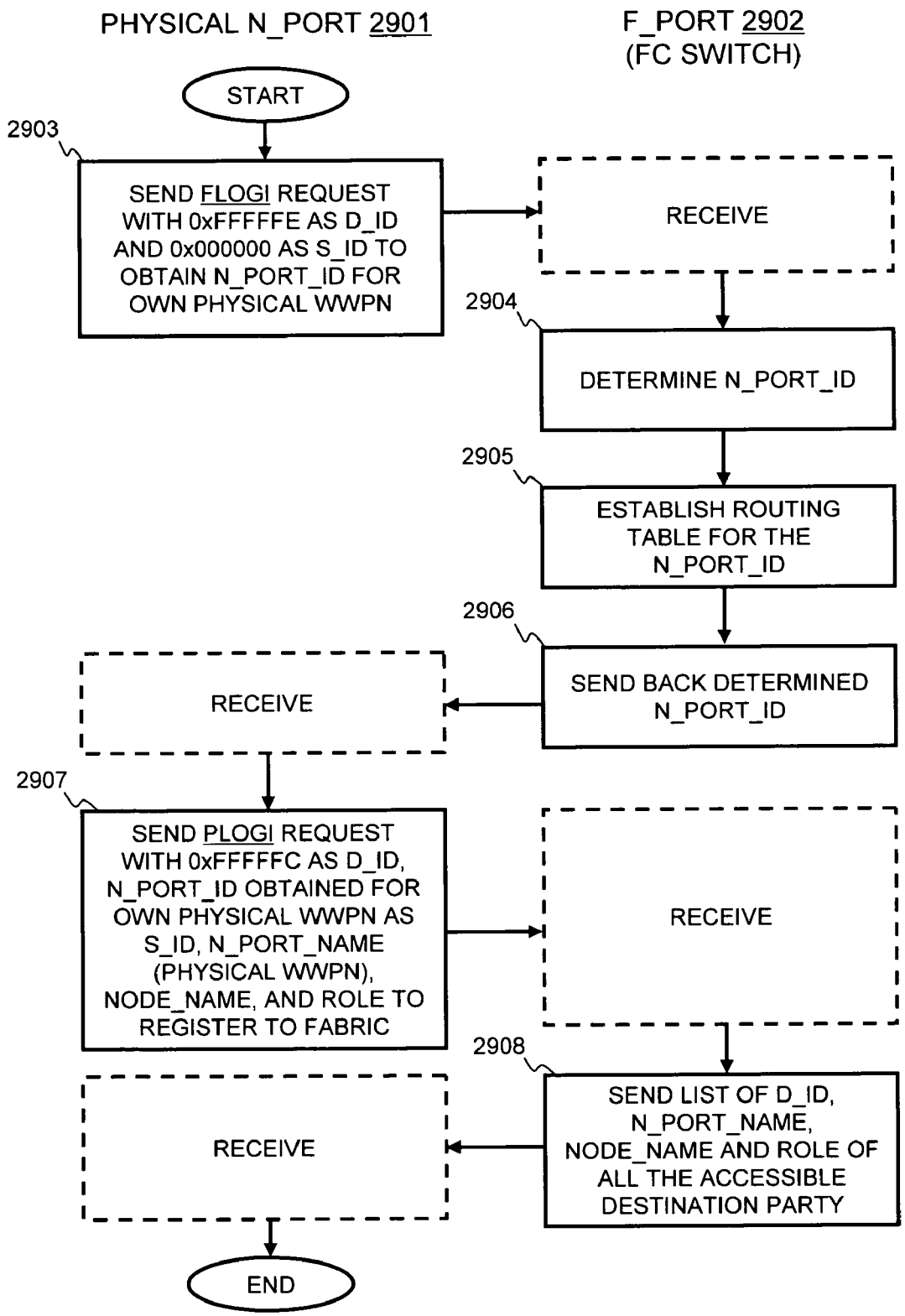
FIG. 29 Fabric Login Procedure for Physical N_Port (Related Art)

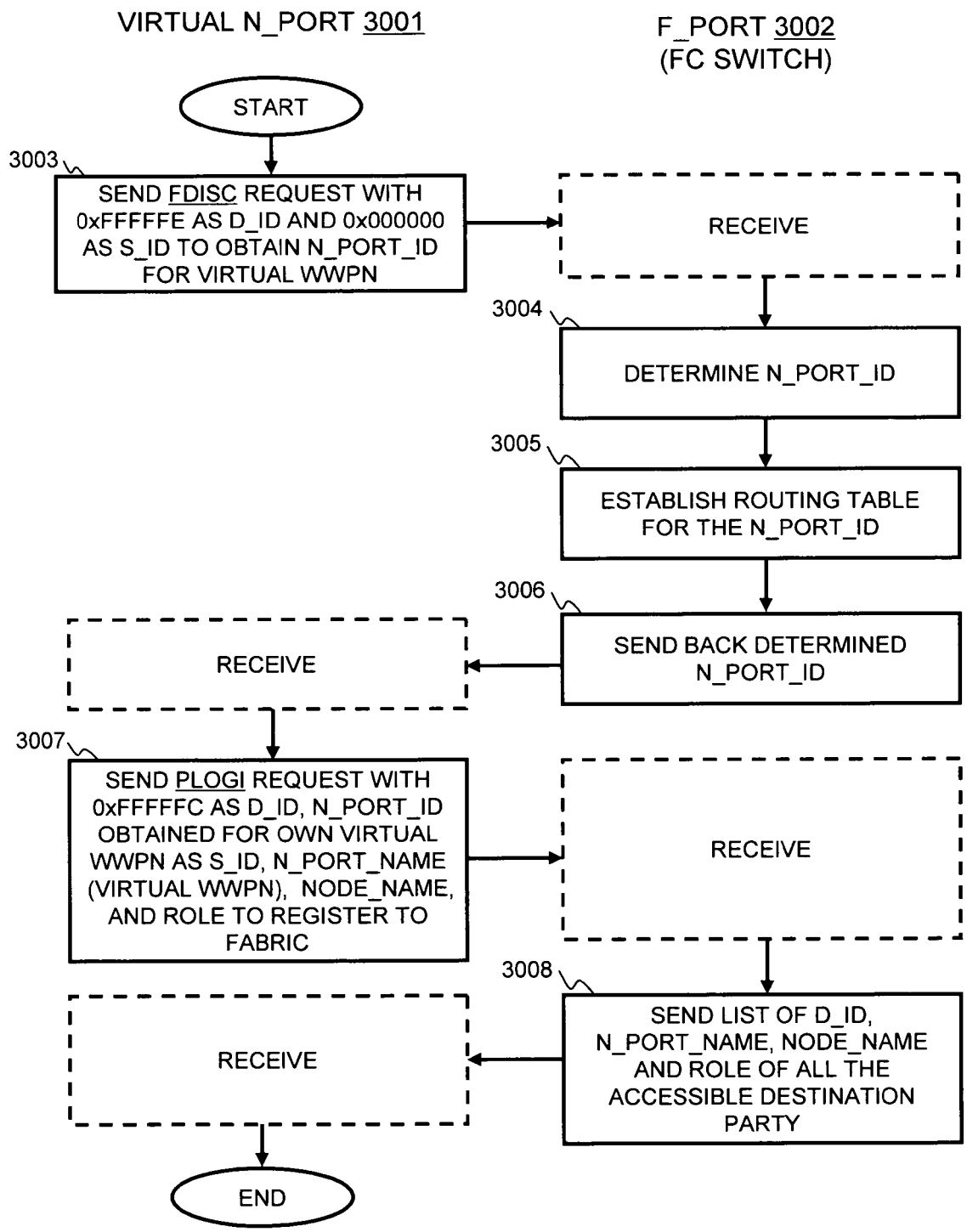
FIG. 30 Fabric Login Procedure for Virtual N_Port (Related Art)

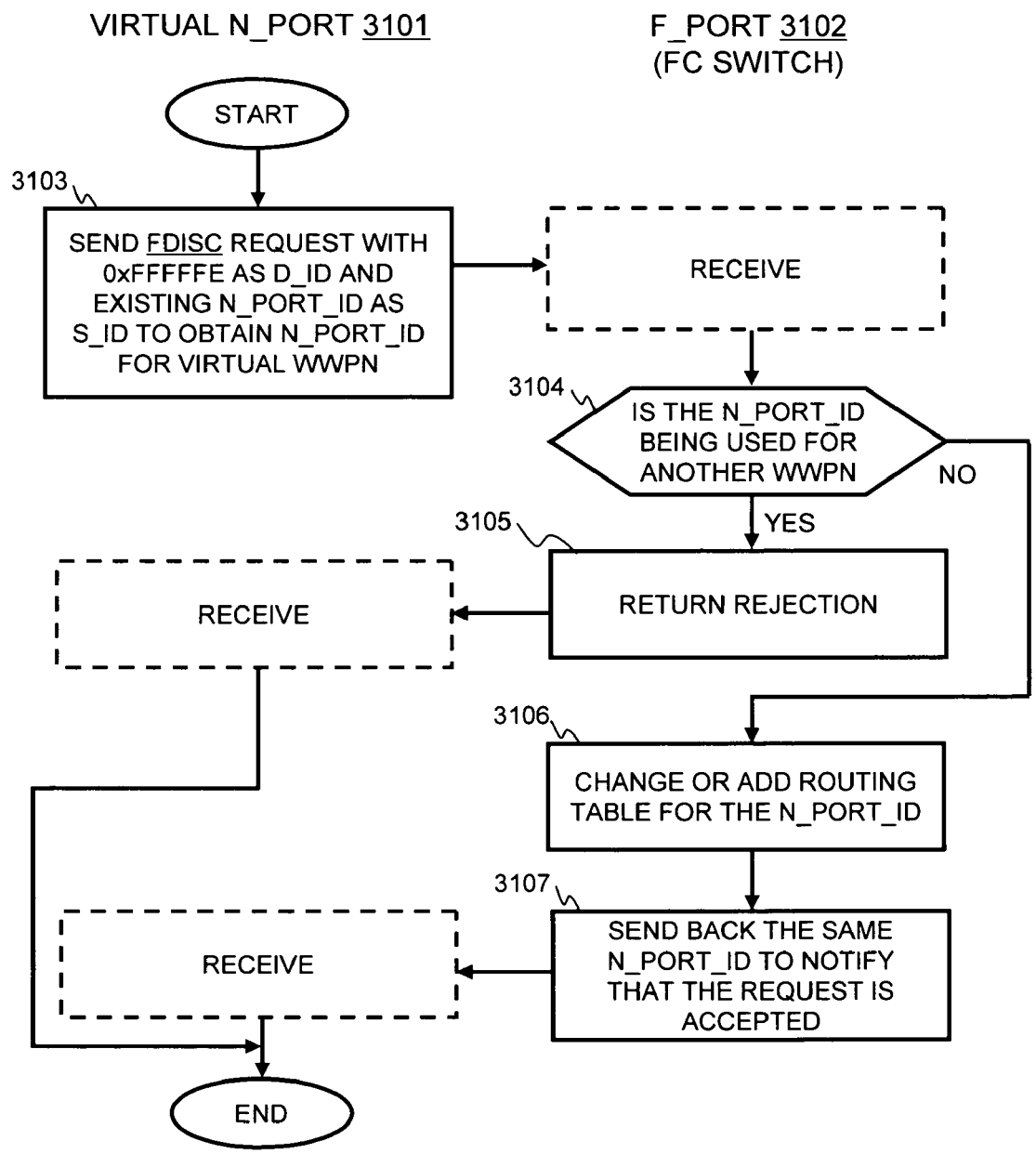
FIG. 31 Fabric Login Procedure for a Virtual N_Port to Re-use an Existing N_Port_ID, or to Specify an N_Port_ID by a Requesting Party (Related Art)

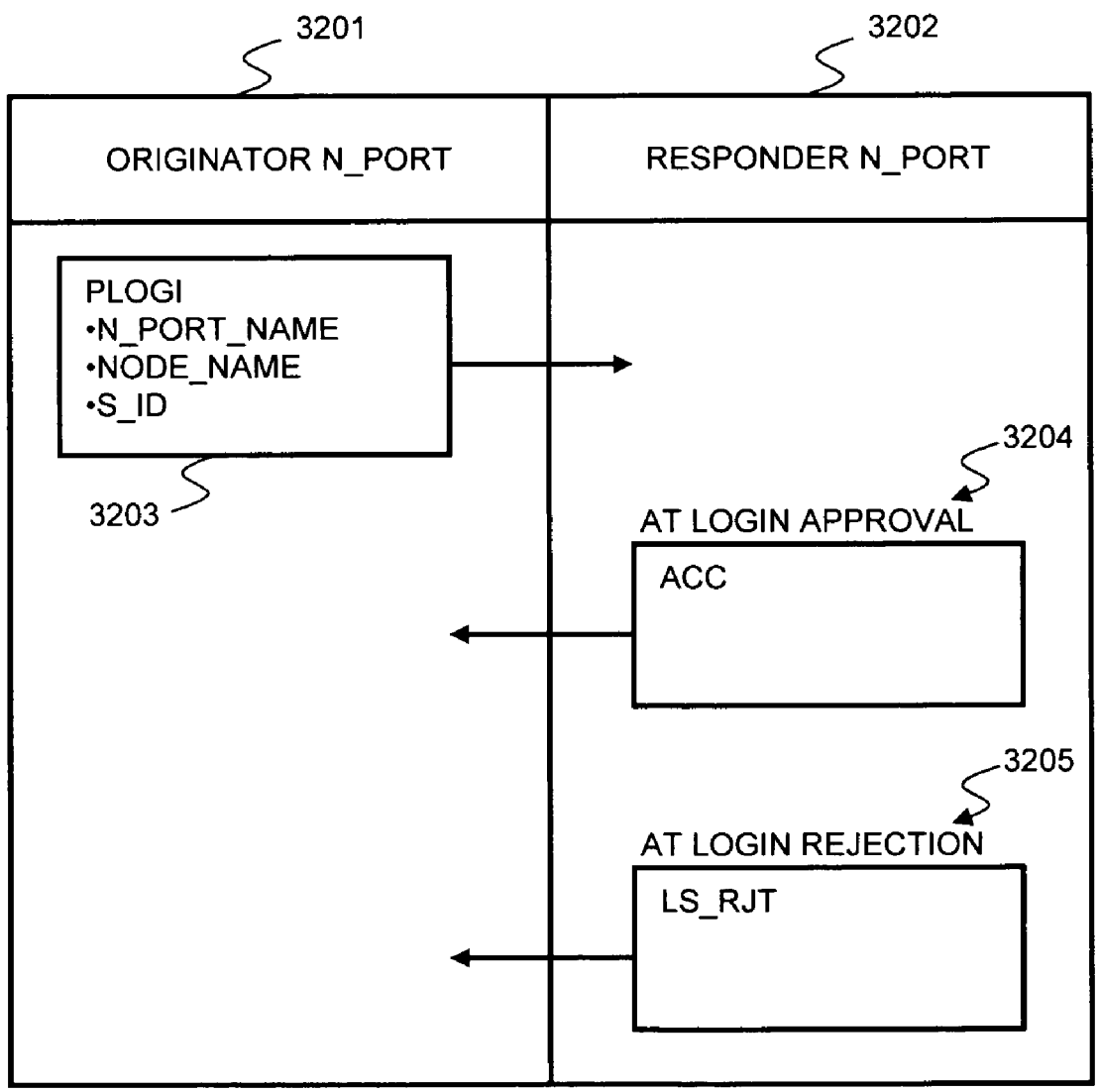
FIG. 32 Port Login to Responder from Originator (Related Art)

METHOD AND APPARATUS FOR I/O PRIORITY CONTROL IN STORAGE SYSTEMS

BACKGROUND OF THE INVENTION

The present invention relates generally to information systems, storage systems and storage area networks (SANs). In information systems, it can be common to have multiple servers (also referred to as "host computers") connected to a single storage system. These multiple servers might often issue simultaneous I/O (input/output) requests to the single storage system. When this occurs, the I/O requests from one server can easily affect the ability of the storage system to process the I/O requests from the other servers, thereby affecting performance of the other servers.

One method of addressing this issue is by implementing priority control among physical interfaces (e.g., channel ports) on storage systems, storage devices, and physical interfaces on servers. For example, priority control among physical interfaces on servers is widely used because it can prioritize at an appropriate level of granularity. Traditionally, priority control among servers has been controlled according to the operating systems (OSs) running on the servers. However, when an OS or an application running on a server is migrated to another server, priority settings on an associated storage system need to be changed because the identification information of the physical interface on the server will change. Also, when a virtual port to which a server is issuing I/O requests is migrated to from one physical interface to another physical interface on a storage system, priority settings on the storage system must be manually transferred to the new physical interface by an administrator.

Another issue that has recently risen to prominence is the amount of power consumed by servers in information facilities (e.g., data centers). One solution currently being implemented to address this issue is server consolidation through the use of virtual machine software. Virtual machine software provides multiple virtual server environments (virtual machines or VMs) on a single physical server (host computer), and enables the single server to run multiple OSs simultaneously, with each of the multiple OSs being able to have one or more separate applications run thereon. In such virtual machine environments, there is often a situation in which multiple OSs on a single server share one physical interface on the server. Thus, in such a situation, priority control among the multiple OSs can not be achieved using prior art techniques because the storage systems cannot distinguish which OS is the originator of which I/O requests since multiple OSs are using the same physical port.

Related art includes U.S. Pat. No. 7,181,607, to Ido et al., entitled "Storage Control Apparatus"; U.S. patent application Ser. No. 11/826,717, to Hara et al., filed Jul. 18, 2007, entitled Method and Apparatus for Managing Virtual Ports on Storage Systems; U.S. patent application Ser. No. 12/000,821, to Hara et al., filed Dec. 18, 2007, entitled "Avoiding Use of an Inter-Unit Network in a Storage System having Multiple Storage Control Units"; and U.S. Pat. No. 6,779,083, to Ito et al., entitled "Security for Logical Unit in Storage Subsystem", the entire disclosures of which are incorporated herein by reference. Additional related art includes the Fibre Channel Standard and corresponding specification documents, such as are available from the InterNational Committee for Information Technology Standards (INCITS) Technical Committee T11 (e.g., t11.org). Especially, for example, documents relating to FC-FS (Fibre Channel Framing and Signaling), FC-DA (Fibre Channel Device Attach), FC-LS (Fibre Channel Link Services), FC-GS (Fibre Channel Generic Services), and FC-PH (Fibre Channel Physical and Signaling Interface) are related to this invention. For example, "Fibre Channel Framing and Signaling-3 (FC-FS-3), Project T11/1861-D Rev 0.20", published by the American National Standards Institute, Inc. Jun. 29, 2007, the disclosure of which is incorporated herein by reference, describes the framing and signaling requirements for Fibre Channel links.

BRIEF SUMMARY OF THE INVENTION

Exemplary embodiments of the invention provide methods, apparatuses and computer readable mediums containing programs to enable priority control and/or transfer of priority settings on the occasion of OS or application migration and/or virtual port or volume transfer. These and other features and advantages of the present invention will become apparent to those of ordinary skill in the art in view of the following detailed description of the preferred embodiments.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

FIG. 1 illustrates an example of a hardware configuration in which the method and apparatus of the invention may be applied.

FIG. 2 illustrates an example of a hardware configuration of a host and service processor.

FIG. 3 illustrates exemplary software module configurations on the storage control unit.

FIG. 4A illustrates exemplary port and volume configurations used for explanation of the first embodiments.

FIG. 4B illustrates exemplary port and volume configurations used for explanation of the first embodiments following transfer of a volume group.

FIG. 5 illustrates an exemplary data structure of a volume group mapping table.

FIG. 6 illustrates an exemplary data structure of a physical path management table.

FIG. 7A illustrates an exemplary data structure of a priority management table according to volume group.

FIG. 7B illustrates an exemplary data structure of a priority management table according to frontend virtual N_Port.

FIGS. 8A-8B illustrate flowcharts of exemplary processes for determining whether an I/O process should be started according to volume group and frontend N_Port, respectively.

FIGS. 9A-9B illustrate flowcharts of exemplary processes for adjusting settings for controlling I/O processes.

FIG. 10 illustrates an exemplary system configuration of the second embodiments

FIG. 11 illustrates an exemplary software module configuration on the storage controller.

FIG. 12 illustrates an exemplary software module configuration on the service processor.

FIG. 13 illustrates exemplary port and volume configurations for explanation purposes.

FIG. 14A illustrates an example of volume group mapping table on Unit_1.

FIG. 14B illustrates an example of volume group mapping table on Unit_2.

FIG. 15A illustrates an example of physical path management table on Unit_1.

FIG. 15B illustrates an example of physical path management table on Unit_2.

FIG. 15C illustrates an example of physical path management table on Unit_3.

FIG. 16A illustrates an example of priority management table on Unit_1 (per volume group).

FIG. 16B illustrates an example of priority management table on Unit_2 (per volume group).

FIG. 17A illustrates an example of priority management table on Unit_1 according to frontend virtual N_Port.

FIG. 17B illustrates an example of priority management table on Unit_2 according to frontend virtual N_Port.

FIG. 18 illustrates an exemplary data structure of an integrated volume group mapping table.

FIG. 19 illustrates an exemplary data structure of an integrated physical path management table.

FIG. 20A illustrates an exemplary data structure of an integrated priority management table (per volume group).

FIG. 20B illustrates an exemplary data structure of an integrated priority management table (per virtual N_Port).

FIG. 21 illustrates an example of transferring of a volume group.

FIG. 22A illustrates an exemplary data structure of a unit performance management table on Unit_1.

FIG. 22B illustrates an exemplary data structure of a unit performance management table on Unit_2.

FIG. 22C illustrates an exemplary data structure of a unit performance management table on Unit_3.

FIG. 23 illustrates an exemplary data structure of an integrated unit performance management table.

FIG. 24 illustrates an exemplary flowchart of checking priority setting at destination unit at transfer.

FIG. 25A illustrates an exemplary data structure of priority management table on Unit_1 (per volume group).

FIG. 25B illustrates an exemplary data structure of priority management table on Unit_1 (per volume group) after transfer.

FIG. 26 illustrates an exemplary data structure of an integrated priority management table (per volume group) after transfer.

FIG. 27 illustrates an exemplary hardware configuration of an FC switch.

FIG. 28 illustrates an exemplary data structure of a frame.

FIG. 29 illustrates a fabric login procedure for a physical N_Port

FIG. 30 illustrates a fabric login procedure for a virtual N_Port.

FIG. 31 illustrates an exemplary fabric login procedure for a virtual N_Port to re-use an existing N_Port_ID, or to specify an N_Port_ID from requesting party.

FIG. 32 illustrates a port login to a responder from an originator.

DETAILED DESCRIPTION OF THE INVENTION

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment" or "this embodiment" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations on data bits within a computer. These algorithmic descriptions and representations are the means used by those skilled in the data processing arts to most effectively convey the substance of their work to others skilled in the art. An algorithm is here, and generally, understood to be a series of defined steps leading to a desired end state or result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing", "computing", "calculating", "determining", "displaying", or the like, can include the action and processes of a computer system or other information processing device that manipulates and transforms data represented as physical (electronic) quantities within the computer system's registers and memories into other data similarly represented as physical quantities within the computer system's memories or registers or other such information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories (ROMs), random access memories (RAMs), solid state devices and drives, or any other type of media suitable for storing electronic information. The algorithms and displays presented herein are not inherently related to any particular computer or other apparatus. Various general-purpose systems may be used with programs in accordance with the teachings herein, or it may prove convenient to construct a more specialized apparatus to perform desired method steps. The structure for a variety of these systems will appear from the description set forth below. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for creating and managing virtual ports on storage systems, and also for transferring virtual ports and volume groups within or among storage control units. Exemplary embodiments of the invention realize a storage control unit able to provide and track priority control among virtual ports created for corresponding physical ports. According to exemplary embodiments, when a virtual port created for a first physical port on a first storage control unit is transferred to another physical port (i.e., a destination physical port), such as in the same storage control unit or on another storage control unit, priority settings on the first physical port and storage control unit are checked and transferred with the virtual port to the other physical port. This ensures that competition among priority of virtual ports will not occur at the destination physical port.

First Embodiment

System Configuration

FIG. 1 illustrates an exemplary configuration of an information system in which the present invention may be applied. In these embodiments, one or more host computers 160 are in communication with a storage control unit 100 via a frontend SAN (storage area network) 170. Storage control unit 100 includes a CPU 101, a memory 102, a NVRAM (nonvolatile memory) 103, a cache memory 104, a disk controller 105, a LAN (local area network) interface controller 108 and SAN interface controllers 107 that are connected with each other via an internal bus 109. CPU 101 administers control of the storage control unit 100. CPU 101 executes micro-programs stored in memory 102 so as to control disk controller 105, SAN interface controllers 107, LAN interface controller 108, and so on. Some of the programs realizing this invention may run on CPU 101 using instruction stored on memory 102, but the instructions may also or alternatively be stored on other computer readable mediums. NVRAM 103 is a nonvolatile memory which can preserve management information even if the power is off. Cache memory 104 serves to temporarily store data to be exchanged among SAN interface controllers 107 and disk controller 105.

Disk controller 105 exchanges data with disk drives 106 in accordance with instructions received from CPU 101. CPU 101 may control disk drives 106 in a configuration according to a RAID level (for example, RAID 0, 1 or 5) conforming to a so-called RAID (Redundant Array of Independent Disks) system via disk controller 105. In such a RAID system, a plurality of disk drives 106 is managed as one group (hereinafter referred to as RAID group). One or more logical volumes (also referred to as "logical units" or "LUs") 114 are formed on each RAID group, and serve as logical storage for access by the host 160. An identifier referred to as an LUN (Logical Unit Number) is assigned to each logical volume 114, and is used by the host computer to identify a particular volume 114. RAID configuration information may be stored in NVRAM 103, and may be referred to by the CPU 101 when the CPU 101 executes a data READ process or a data WRITE process. Alternatively, in other embodiments, the apparatus for operation of the invention may be arranged without the disk controller 105 and disk drives 106, and instead may rely on one or more external storage systems 130 for providing the physical storage capacity. Also, in other embodiments, more than one storage control unit 100 may be provided.

SAN interface controllers 107 are interface controllers that are connected to frontend SAN 170 or backend SAN 120. These controllers operate to send and receive communications via FC (Fibre Channel) networks. LAN interface controller 108 is connected to service processor 140 via a LAN 150. LAN 150 may be an Ethernet® network in which data transmission using the TCP/IP (Transmission Control Protocol/Internet Protocol) protocol is carried out. LAN 150 may be used for exchanging management and control information between service processor 140 and storage control unit 100. Further, in some embodiments, a WAN (wide area network), such as the Internet, might be used in place of LAN 150.

One or more external storage control units 130 may be connected to storage control unit 100, and may be managed by the storage control unit 100 for providing additional physical capacity to storage control unit 100. External storage control unit 130 may be constructed to have the same components as those shown in storage control unit 100. However, typically external storage control unit 130 will not include the functions for managing other storage control units that are included in storage control unit 100. External storage control unit 130 is connected to storage control unit 100 via backend SAN 120. In another arrangement, the external storage control unit 130 may be connected to the storage control unit 100 directly without SAN 120.

Storage control unit 100 can include a virtualization function that presents logical volumes (or logical units, LUs) in external storage control unit 130 so as to appear to the host 160 as being logical volumes inside the storage control unit 100. These virtual volumes are also referred to as "virtual logical units" or "VLUs". When virtual volumes are used on storage control unit 100, a host does not need to know whether a particular volume is a logical volume on storage control unit 100 or a virtual volume that corresponds to a logical volume on external storage control unit 130. Thus, when reading data from or writing data to the external storage control unit 130, the host 160 issues an I/O (read or write) request to the virtual LU in storage control unit 100. The storage control unit 100 converts the received request to a corresponding I/O request (respective read or write command) directed to the corresponding logical volume in the external storage control unit 130. Also, in other embodiments, external storage control unit 130 may not exist. In that case, storage control unit 100 just provides logical volumes 114 using the internal disk drives 106.

Backend SAN 120 may include one or more FC switches 180 for mediating communication between storage control unit 100 and external storage control unit 130 conforming to FC-SW (Fibre Channel Switched Fabric) standard. Embodiments of the invention may be arranged with one SAN serving as both frontend SAN 170 and backend SAN 120, or two separate SANs may be used, as illustrated. In the case where the external storage control unit 130 does not exist, backend SAN 120 is not needed. Frontend SAN 170 may also include one or more FC switches 180 for mediating communication between hosts 160 and storage control unit 100 conforming to FC-SW (Fibre Channel Switched Fabric) standard. In some embodiments, the same one or more FC switches 180 may be used for both frontend SAN 170 and backend SAN 120.

Hosts 160 may be, for example, personal computers, work stations, mainframe computers, or the like. Host 160 executes application programs such as database applications, server applications, or the like, and writes processing results to storage control unit 100, and utilizes information resources (i.e., data) stored therein. As illustrated in FIG. 2, host 160 may typically comprise a CPU 201, a memory 202, a storage device 203, a SAN interface controller 204, which may be a FC interface controller, and a LAN interface controller 205, which may be an Ethernet® interface controller. These components are connected to each other via an internal bus 206. Host 160 is connected to storage control unit 100 through SAN interface controller 204 via frontend SAN 170.

Service processor 140, as also illustrated in FIG. 2, may include the same hardware components as hosts 160, and is connected to storage control unit 100 via LAN 150 for carrying out management operations and the like. Service processor 140 may be used to carry out, for example, configuration setting and operation information acquisition with respect to storage control unit 100. An administrator using service processor 140 can execute creation of logical volumes in storage control unit 100, allocation of logical volumes to hosts 160, zoning, and LUN masking setting through service processor 140.

As illustrated in FIG. 27, FC switches 180 typically may include a CPU 181, a memory 182, an NVRAM 183, a cache memory 184, and a plurality of FC interface controllers 185. The invention may be arranged with one FC switch serving as both a frontend FC switch and a backend FC switch on the condition that the FC switch 180 is able to mediate among one or more hosts 160, one or more storage control units 100, and one or more external storage control units 130.

Software Modules

In these exemplary embodiments, as illustrated in FIG. 3, there are several different kinds of software modules used by the storage control unit 100 when carrying out the invention. These software modules may be loaded or stored in memory 102 on storage control unit 100 or other computer readable medium. Also, several different management tables for use by the invention may be stored in NVRAM 103 on storage control unit 100 or other computer readable medium. One of the modules is a volume group manager 301 that manages mapping between VLUs on storage control unit 100 and LUs on external storage control unit 130 using a volume group mapping table 304 within storage control unit 100. Volume group manager 301 also controls and decides to which hosts the VLUs are exported. For example, VLUs may be matched with virtual N-Ports to form volume groups, as discussed further below, and the VLUs are exported by the volume group manager 301 by determining through which virtual N_Ports the VLUs are exported to the host. The VLUs are mapped to LUs on the physical N_Port with which the virtual N_Port is associated using volume group mapping table 304 within storage control unit 101.

A physical path manager 302 manages the physical N_Ports that reside on storage control unit 100. Physical path manager manages the physical ports to control which host 160 or external storage control unit 130 each physical N_Port can reach, and also monitors the status of each physical N_Port using a physical path management table 305 within storage control unit 100.

I/O process module 303 receives and processes I/O read/write requests from host 160. At the start of every I/O process, I/O process module 303 determines whether the I/O process can be started based on a priority management table 306.

Priority Manager 304 changes settings on priority management table 304 in accordance with instructions from administrator through service processor 140. The volume group mapping table 304, physical path management table 305, and priority management table 306 are described further below.

Fibre Channel Protocol

A device having a Fibre Channel interface is referred to as a "node", and a physical terminal corresponding to the interface is referred to as a "port". One node can have one or more ports. The number of ports that can simultaneously participate in an overall Fibre Channel system is an address number of a maximum of 24 bits, that is, $2^{24}$ (16,777,216). Hardware such as Fibre Channel (FC) switches that mediate these connections is referred to as a "fabric" or "switching fabric". Each port on each node is called an "N_Port", and a port on an FC switch is called an "F_Port". In this description, hosts 160, storage control units 100, and external storage control units 130 are referred to as "nodes", an "N_Port" corresponds to each SAN interface controller 107 on each node, and an "F_Port" corresponds to an FC interface controller 185 on FC switch 180. Thus, in the configuration of FIG. 1, the SAN interface controllers 107 that are in communication with frontend FC switch 180a may be referred to as "frontend physical ports", while the SAN interface controllers 107 that are in communication with backend FC switch 180b may be referred to as "backend physical ports". In the situation that there is only one FC switch 180 that serves as both the frontend and backend FC switch, a single SAN interface controller 107 may act as both a frontend and backend physical port through the use of multiple virtual ports assigned to each physical port, as will be explained further below. Further, multiple physical ports may be provided on each storage control unit for communication with the single FC switch.

Each of the nodes and N_Ports stores identification data that is unique worldwide, and that is assigned in accordance with predetermined rules by IEEE (Institute of Electrical and Electronics Engineers, Inc.), a standardization organization. Since this identification data is unique worldwide, it is called a "WWN" (World Wide Name) as an address capable of serving as a primary identifier for identifying a particular port. WWNs in an FC network are hardware-fixed addresses that are similar to MAC addresses that are used in IP networks. There are two kinds of WWN addresses in an FC network, namely, an N_Port_Name and a Node_Name, each having an eight-byte size. N_Port_Name is a value (hardware address) unique to each port, and Node_Name is a value (hardware address) unique to each node. In the examples of the invention, the term "WWPN" (World Wide Port Name) represents an N_Port_Name.

When an N_Port is connected to a fabric, a unique ID within the fabric called N_Port_ID is assigned to each N_Port by the FC switch mediating the fabric. The FC switch routes transmissions among the nodes connect to the FC switch based on the N_Port_IDs. Fibre Channel protocol allows an N_Port to create additional WWPNs on it, and have additional N_Port_IDs assigned to each additional WWPN. This is a port virtualization feature that is call "N_Port_ID Virtualization" or "NPIV". The additional WWPNs are typically determined on each device automatically so that they will be unique within the fabric. To clarify between WWPNs as hardware address and WWPNs as additional address created dynamically, this description will use the terms "physical WWPN" and "physical N_Port" for WWPN as hardware addresses, and the terms "virtual WWPN" and "virtual N_Port" for WWPNs created dynamically as additional addresses on a physical N_Port.

In Fibre Channel protocol, communication is executed by information at a signal level referred to as an "Ordered Set" and using logical information having a fixed format referred to as a "frame". Basically, an I/O request originator initiates an I/O process by transmitting one or more frames, and a responder acts in response to the received frames. In this invention, in the SAN mediated by frontend FC switch 180a, hosts 160 correspond to originators, and storage control unit 100 corresponds to responders. On the other hand, in the SAN mediated by backend FC switch 180*b*, storage control unit 100 corresponds to originators, and external storage control units 130 correspond to responders.

FIG. 28 illustrates a structure of a frame. Each frame 2801 has 4-byte identification data representing the start of the frame and called "SOF" (Start Of Frame) 2802, a 24-byte frame header 2803 characterizing control of a link operation and the frame, a data field 2804 as a data part, which is the object to be practically transferred, a 4-byte cyclic redundancy code (CRC) 2805, and a 4-byte identification data called "EOF" (End Of Frame) 2806 which represents the end of the frame. The data field 2804 is variable within 0 to 2,112 bytes. With respect to the structure of frame header 2803, explanation will be given on only D_ID 2808, S_ID 2809, SEQ_ID 2810, and SEQ_CNT 2811 in the frame header 2803. D_ID (Destination ID) 2808 and S_ID (Source ID) 2809 are 3-byte address identification data for identifying the N_Port receiving the frame and the N_Port transmitting the frame respectively, and have values effective for all the frames to be transmitted and received. FC_PH (Fibre Channel Physical and Signaling Interface) Standard, as one of the standard sets of the Fibre Channel standard, stipulates that the fabric allocates D_ID 2808 and S_ID 2809 during the initialization procedure which is called "fabric login". Detailed description of fabric login will be made later. SEQ_ID 2810 (Sequence ID) is a unique identifier for the sequence of each frame. Here, a sequence is a group of frames that consists a transaction between an originator and a responder. SEQ_CNT (Sequence Count) 2811 is a number of the frame within the sequence. A responder can identify the sequence to which the frame belongs, by referring to SEQ_ID 2810, and sort the frames received within each sequence referring SEQ_CNT 2811.

Fabric Login Procedure for Physical N_Port

To participate in a fabric, all the N_Ports to be connected to a fabric need to initially perform a fabric login. Through the fabric login, the FC switch assigns an N_Port_ID to each N_Port, and then establishes routing information for the N_Port on the FC switch. The login procedure used for physical N_Ports is slightly different from the login procedure used for virtual N_Ports.

FIG. 29 illustrates the exchange of information between a physical N_Port 2901 on a node and an F_Port 2902 on an FC switch. Typically, this login procedure is carried out when a physical N_Port is first physically connected to an F_Port on an FC switch. First, as illustrated in step 2903, physical N_Port 2901 transmits a FLOGI frame containing a fixed D_ID (0xFFFFFE) 2808, fixed S_ID (0x000000) 2809, and N_Port_Name (physical WWPN) and Node_Name of the physical N_Port 2901. Then, in step 2904, FC switch having the F_Port 2902 determines the N_Port_ID to be used for the WWPN of the physical N_Port 2901 based on the FC-PH standard. After determining the N_Port_ID, in step 2905, the FC switch having the F_Port 2902 establishes routing information for the N_Port_ID, and sends back the determined N_Port_ID to the physical N_Port 2901 in step 2906. After receiving the N_Port_ID, physical N_Port 2901 regards the received N_Port_ID as its own N_Port_ID, and transmits a PLOGI frame with its own N_Port_ID as S_ID 2809, N_Port_Name (physical WWPN) and Node_Name to the F_Port 2902 in step 2907. In response to that, the FC switch having the F_Port 2902 sends back a list of D_IDs (N_Port_IDs), N_Port_Names (both physical and virtual WWPNs) and Node_Names of all the other accessible N_Ports logged on in the fabric in step 2908. Through this procedure, equipment having the N_Port 2901 is able to acquire the correspondence between N_Port_ID and N_Port_Name (i.e., both physical and virtual WWPNs) for each N_Port on the fabric.

N_Port_ID Virtualization and Fabric Login for Virtual N_Port

As part of the Fibre Channel protocol, N_Port_ID Virtualization (NPIV) is defined. This feature allows a physical N_Port to have multiple virtual N_Ports created on it. A virtual WWPN for each virtual N_Port is determined on each N_Port, and additional login procedure for each virtual WWPN is performed to acquire the N_Port_ID for each virtual WWPN by transmitting the login request through the physical N_Port that has previously logged in to the fabric using the procedure of FIG. 29.

FIG. 30 illustrates the exchange of information between a virtual N_Port 3001 and an FC switch having an F_Port 3002. The procedure illustrated in FIG. 30 is performed via physical N_Port associated with the virtual WWPN for which the fabric login procedure illustrated in FIG. 29 is previously performed. The procedure itself is almost the same as the fabric login procedure for physical N_Port illustrated in FIG. 29. However, as illustrated in step 3003, an FDISC request is used instead of an FLOGI request is used for virtual WWPN so that FC switch having F_Port 3002 can determine that the fabric login request sent from N_Port is for a virtual WWPN. Then, in step 3004, the FC switch having the F_Port 3002 determines the N_Port_ID to be used for the virtual WWPN of the virtual N_Port 3001 based on the FC-PH standard. After determining the N_Port_ID, in step 3005, the FC switch having the F_Port 3002 establishes routing information for the N_Port_ID, and sends back the determined N_Port_ID to the virtual N_Port 3001 in step 3006. After receiving the N_Port_ID, virtual N_Port 3001 regards the received N_Port_ID as its own N_Port_ID, and transmits a PLOGI frame with its own N_Port_ID as S_ID 2809, N_Port_Name (virtual WWPN) and Node_Name to the F_Port 3002 in step 3007. In response to that, the FC switch having the F_Port 3002 sends back a list of D_IDs (N_Port_IDs), N_Port_Names (both physical and virtual WWPNs) and Node_Names of all the other accessible N_Ports logged on in the fabric in step 3008.

Re-Use of Previously Assigned N_Port_IDs

Currently, there is no protocol defined in Fibre Channel protocol for re-using a previously assigned N_Port_ID, or for requesting a specific N_Port_ID from FC switch by an N_Port. However, a method of implementing such a function is modeled herein that is similar to the transfer of an IP address between physical ports having different MAC addresses in a TCP/IP network by corresponding the N_Port_ID in an FC network to an IP address in a TCP/IP network. In TCP/IP, an IP address can be transferred between physical ports having different MAC addresses, and then the IP address can be re-used so that client hosts can access the services exported through the IP address without changing configuration on the client hosts, even in the case where the IP address is transferred to another physical port having a different MAC address. In TCP/IP, the ARP command is used to notify network switches that the IP address is to be transferred to another physical port. In response to the command, the network switches change routing information for the IP address.

In this invention, as in a TCP/IP network, it is assumed that the virtual N_Port can issue a request to use a existing N_Port_ID, i.e., an N_Port_ID assigned through a fabric login procedure performed beforehand, such as using the procedure set forth in FIG. 30. As an example, an FDISC command is assumed to use to notify the FC switch that the virtual N_Port is to be transferred to another physical N_Port.

FIG. 31 illustrates example of a fabric login procedure for a virtual N_Port 3101 to re-use an existing N_Port_ID or to request a specific N_Port_ID for the virtual N_Port from an FC switch having F_Port 3102. In step 3103, the virtual N_Port sends an FDISC request with the existing N_Port_ID set in S_ID field 2809. In response to the request, in step 3104, FC switch having F_Port 3102 checks whether the N_Port_ID is being used for (i.e., already assigned to) another WWPN. If the N_Port_ID is already assigned to another WWPN, then in step 3105, FC switch having F_Port 3102 rejects the request. On the other hand, if the requested N_Port_ID has not yet been assigned to another WWPN, then in step 3106, FC switch having F_Port 3102 changes routing information for N_Port_ID in its own routing information, and in step 3108, FC switch having F_Port 3102 sends back the same N_Port_ID to virtual N_Port 3102 to provide notification that the request was accepted.

Node Login Procedure

In Fibre Channel protocol, before an originator starts sending frames to a responder, the N_Port of the originator needs to login to the N_Port of the responder using a procedure called port login. FIG. 32 illustrates the exchange of information between the originator N_Port 3201 and the responder N_Port 3202. This procedure is the same for both physical N_Ports and virtual N_Ports. First, in step 3203, originator N_Port 3201 transmits a PLOGI frame 3203 to responder N_Port 3202. This request contains the N_Port_Name (physical WWPN or virtual WWPN), Node_Name, S_ID and other information of the originator N_Port 3201. After receiving the PLOGI request, responder N_Port 3202 saves the information contained in the request. When approving the request, responder N_Port 3202 transmits a frame called "ACC" 3204 to the originator N_Port 3201. When rejecting the request, responder N_Port 3202 transmits a frame called "LS_RJT" 3205 to the originator N_Port 3201. When the originator N_Port receives a response including the ACC frame in response to the PLOGI frame, the originator N_Port 3201 now knows that login was successful, and can start sending I/O requests to the responder N_Port 3202. However, if the originator receives an LS_RJT frame, then the originator N_Port 3201 knows that the login was not established, and that sending I/O requests to the responder N_Port 3202 is not allowed.

Management Tables

FIG. 4A is an illustrative drawing of a possible configuration of ports and logical volumes according to the invention. This configuration is one example of many possible configurations, and is used to explain further details of the invention. Physical WWPNs are represented with a name of "WWPN_#" (# is replaced with numbers for individual ports), and the N_Port_ID assigned to a physical WWPN is represented with a name of "N_Port_ID_#". Virtual WWPNs are represented with a name of "WWPN_V#" (# is replaced with numbers for individual virtual ports), and the N_Port_ID assigned to a virtual WWPN is represented with a name of "N_Port_ID_V#".

For example, SAN interface controller 204 (an N_Port) on host 160 has "WWPN_1" as its physical WWPN and "N_Port_ID_1" assigned to it by frontend SAN 170 as its N_Port_ID. Also, SAN interface controller 107a on storage control unit 100 is connected to frontend SAN 170, and has "WWPN_2" as its physical WWPN and "N_Port_ID_2" assigned to it by frontend SAN 170 as its N_Port_ID. Further, SAN interface controller 107d on storage control unit 100 is connected to frontend SAN 170, and has "WWPN_3" as its physical WWPN and "N_Port_ID_3" assigned to it by frontend SAN 170 as its N_Port_ID. Also, SAN interface controller 107b on storage control unit 100 is connected to backend SAN 120, and has "WWPN_5" as its physical WWPN and "N_Port_ID_5" assigned to it by backend SAN 170 as its N_Port_ID. Further, SAN interface controller 107e on storage control unit 100 is connected to backend SAN 120, and has "WWPN_6" as its physical WWPN and "N_Port_ID_6" assigned to it by backend SAN 170 as its N_Port_ID. Additionally, SAN interface controller 107c on external storage control unit 130 has "WWPN_8" as its physical WWPN and "N_Port_ID_8" assigned to it by backend SAN 170 as its N_Port_ID.

Furthermore, virtual ports may be created on the physical ports in storage control unit 100. For example, in the illustrated embodiments, storage control unit 100 has "WWPN_V1" as a virtual WWPN and "N_Port_ID_V1" assigned to this virtual WWPN as its N_Port_ID by frontend SAN 170. Virtual WWPN "WWPN_V1" is currently associated with physical N_Port_WWPN_2. Similarly, "WWPN_V2" is a virtual WWPN and "N_Port_ID_V2" is assigned to this virtual WWPN as its N_Port_ID by frontend SAN 170. Virtual WWPN "WWPN_V2" is also currently associated with physical N_Port WWPN_2. Additionally, "WWPN_V5" is a virtual WWPN and "N_Port_ID_V5" is assigned to this virtual WWPN as its N_Port_ID by frontend SAN 170. Virtual WWPN "WWPN_V5" is currently associated with physical N_Port WWPN_3.

Also, volume groups 138 may be configured as groups of logical or virtual volumes. Volume groups 138 may have a priority setting assigned which is applied to I/O operations directed to the volumes in a particular group. Volume groups 138 may also include associated virtual ports. For example volume Group1 138-1 includes VLU1, VLU2, and virtual ports WWPN_V1 and WWPN_V3; volume Group2 138-2 includes VLU3, VLU4, and virtual ports WWPN_V2 and WWPN_V4; and volume Group3 138-3 includes LU11, LU12 and virtual port WWPN_V5. Volume Group3 communicates through physical port WWPN_3, which corresponds to SAN interface controller 107d. Group3 does not require a backend connection to backend port WWPN_6, since logical volumes LU11, LU12 are created on local storage mediums 106 in this embodiment, as illustrated in FIG. 1.

As illustrated in FIG. 4A, in the illustrated example configuration, external storage control unit 130 exports four logical units (LUs) 134 (LU1 to LU4) through WWPN_8. Storage control unit 100 manages and exports the LUs 134 to host 160 as virtual logical units (VLUs) 133. For example, LU1 is presented to host 160 as VLU1; LU2 is presented to host 160 as VLU2; LU3 is presented to host 160 as VLU3; and LU4 is presented to host 160 as VLU4. Thus, host 160 is able to access and use virtual volumes VLU1-VLU4 as if they were logical volumes present on storage control unit 100, while storage control unit 100 uses the physical storage capacity provided by LU1-LU4 on the external storage control unit 130 for the capacity of VLU1-VLU4, respectively. In the illustrated embodiment, VLU1 and VLU2 are exported through virtual port name WWPN_V1 and mapped to LU1 and LU2 using virtual port name WWPN_V3. Similarly, VLU3 and VLU4 are exported through virtual port name WWPN_V2 and mapped to LU3 and LU4 using virtual port name WWPN_V4.

According to this configuration, for example, when the N_Port having the world wide port name WWPN_1 on host 160 accesses data stored in LU1 on external storage control unit 130, port WWPN_1 sends an I/O request with a first frame, such as frame 2801 illustrated in FIG. 28. The first frame contains an I/O request with "N_Port_ID_1" as S_ID 2809 and "N_Port_ID_V1" as D_ID 2808. After receiving the frame, storage control unit 101 sends a converted I/O request with a second frame to external storage 130 with "N_Port_ID_V3" as S_ID 2809 and "N_Port_ID__8" as D_ID 2808. In response to receiving the second frame and associated I/O request, external storage control unit 130 returns a third frame including a response to the I/O request with "N_Port_ID__8" as S_ID 2809 and "N_Port_ID_V3" as D_ID 2808. After receiving the third frame, storage control unit 101a sends a fourth frame containing a converted response with "N_Port_ID_V1" as S_ID 2809 and "N_Port_ID__1" as D_ID 2808.

Additionally, priority settings might be established for a volume group or for a particular virtual port. For example, volume group Group1 138-1 might have a priority setting that gives I/O operations directed to volumes VLU1 and VLU2 priority over I/O operations directed to Group2 volumes VLU3 and VLU4. Thus, Group1 138-1 may be considered a priority group and Group2 138-2 a non-priority group. Priority may be assigned by an administrator and determined based upon various factors such as priority of applications or operating systems running on a host 160, or other considerations. Furthermore, priority may be established according to each frontend virtual port instead of according to volume group. For example WWPN_V1 may be assigned a priority setting, while WWPN_V2 may be assigned a non-priority setting regardless of which volumes or virtual volumes are accessed through the particular virtual ports.

At some point it may be desirable to transfer, for example, volume Group1 138-1 from being accessed through physical port WWPN__2 to being accessed through physical port WWPN__3, such as for load balancing purposes or the like. This transferred arrangement is illustrated in FIG. 4B, which shows that volume Group1 138-1 has been transferred. Further, while FIG. 4B illustrates that virtual ports WWPN_V1 and WWPN_V3 have been transferred as part of volume Group1, it is also possible to transfer just the volumes, such as to associate the volume with a new virtual or physical port, or to transfer just a virtual port to be associated with new volumes, or the like. For example, in the case in which volumes are not associated with particular virtual ports, it may be desirable to transfer a virtual port with priority, such as for load balancing among physical ports, or the like. In conjunction with this transfer, it is desirable that the processing priorities in place for volume Group1 138-1 be maintained at the new physical port WWPN__3 without administrator intervention. Similarly, if priority is assigned to a frontend virtual port, it would also be desirable to maintain the priority associated with that particular frontend virtual port if the frontend virtual port is transferred to another physical port. In the following description, methods, apparatuses and programs for maintaining these priority settings are described.

Volume Group Mapping Table

FIG. 5 illustrates an exemplary data structure of volume group mapping table 304. The values in FIG. 5 represent the state of the system illustrated in FIG. 4A. Volume group 501 indicates an arbitrary name of the group of logical volumes and virtual N_Ports. Target host N_Port 502 indicates WWPN of the N_Port on host 160 to which logical volumes in the group are exported. Exported volume 503 provides identifiers of logical volumes within storage control unit 100 that are exported to host 160. External N_Port 504 indicates the WWPN of N_Ports on external storage control unit 130 in which reside the actual LUs corresponding to each exported virtual volume. A null value is set in this field if exported volumes correspond to LUs created locally inside storage control unit 100, such as in the case of LU11, LU12. External volume 505 indicates identifiers of LUs on external storage control unit 130 corresponding to exported volumes 503. A null value is set in this field if the exported volumes 503 correspond to LUs created locally inside storage control unit 100, such as in the case of LU11, LU12. Frontend virtual N_Port 506 indicates WWPN of virtual N_Ports that are used to export exported volumes 503 to host 160. Frontend N_Port_ID 507 indicates the N_Port_ID assigned to the frontend virtual WWPN 506. Backend virtual N_Port 508 indicates WWPN of the virtual N_Ports that are used to access external storage control unit 130. A null value is set in this field if the exported volumes 503 correspond to LUs created locally inside storage control unit 100, such as in the case of LU11, LU12. Backend N_Port_ID 509 indicates the N_Port_ID assigned to the backend virtual WWPN 508. A null value is set in this field if the exported volumes 503 correspond to LUs created locally inside storage control unit 100, such as in the case of LU11, LU12. Current frontend physical N_Port 510 indicates the WWPN of the physical N_Port that is currently associated with the frontend virtual WWPN 506, which is the WWPN of the physical N_Port through which the N_Port_ID for the frontend virtual WWPN 506 is acquired. Current backend physical N_Port 511 indicates the WWPN of the physical N_Port that is currently associated with the backend virtual WWPN 506, which is the WWPN of the physical N_Port through which the N_Port_ID for the backend virtual WWPN 508 is acquired. A null value is set in this field if the exported volume 503 corresponds to LUs created locally inside storage control unit 100, such as in the case of LU11, LU12.

Physical Path Management Table

FIG. 6 illustrates an exemplary data structure of physical path management table 305. The values in FIG. 6 represent the state of the system illustrated in FIG. 4A. Physical N_Port 601 indicates the WWPN of the physical N_Port that can be used to access hosts 160 or external storage control units 130. Status 602 indicates the status of the physical N_Port 601. An "OK" entry indicates that the N_Port is working properly, while an "ERROR" entry shows that the N_Port is not working because of some failure. Reachable N_Port 603 indicates a list of WWPNs of N_Ports to which the physical N_Port 601 can reach. This information can be acquired when the physical N_Port performs the fabric login procedure described above with respect to FIG. 29.

Priority Management Table

FIGS. 7A-7B illustrate exemplary data structures of priority management table 306. Priority in these embodiments can be assigned according to each volume group or each frontend virtual N_Port. The priority management table 306a in FIG. 7A illustrates the priority management table in the case in which priority is assigned according to each volume group. Volume Group 701a indicates a name of a volume group for which settings in the following fields are applied. Priority 702 indicates priority setting of the volume group. If the volume group is priority, then "Priority" is set in this field. Otherwise, "Non-priority" is set in this field. IOPS (input/outputs per second) Measured Value (Ie) 703 indicates actual performance status of the volume group. This value is measured and updated periodically by I/O process module 303. IOPS Threshold (It) 704 indicates IOPS threshold information for determining whether I/O processing for non-priority volume groups should be suppressed. IOPS Threshold (It) 704 is compared with IOPS Measured Value (Ie) 703 periodically, and when IOPS Measured Value (Ie) 703 exceeds IOPS Threshold (It) 704, I/O processes for non-priority volume groups will be suppressed. A null value is set in this field if the volume group is "non-priority". Target IOPS (Io) 705 indicates target IOPS performance for the volume group. A null value is set in this field if the volume group is "non-priority". Delay Setting (St) 706 indicates an amount of delay time that is used to suppress the I/O processing for the volume group when needed. A null value is set in this field if the volume group is "priority". Delay Timer (Dt) 707 indicates a delay timer that is used to suppress the I/O processing for the volume group when needed. A null value is set in this field if the volume group is "priority". IOPS Max (Iu) 708 indicates a maximum I/O performance that is considered when I/O processing for the volume group needs to be suppressed. A null value is set in this field if the volume group is "priority". IOPS Min (IL) 709 indicates a minimum I/O performance that is considered when I/O processing for the volume group needs to be suppressed. A null value is set in this field if the volume group is "priority". Accordingly, IOPS Threshold (It) 704 and Target IOPS (Io) 705 are set only for priority volume groups, and Delay Setting (St) 706, Delay Timer (Dt) 707, IOPS Max (Iu) 708, and IOPS Min (IL) 709 are set only for non-priority volume groups.

The priority management table 306b in FIG. 7B illustrates an example of the priority management table 306 in the case where priority is assigned to each frontend virtual N_Port. In priority management table 306b, Frontend Virtual N_Port 701b entry replaces the Volume Group entry 701a, while the other fields of the priority management table 306b are the same as those in the priority management table 306a described above with respect to FIG. 7A. Frontend Virtual N_Port 701b indicates a name of a frontend virtual N_Port for which the settings in the following fields are applied.

Determining Whether an I/O Process Should be Started

FIGS. 8A-8B illustrate flowcharts of exemplary processes for determining whether an I/O process command should be started or not. These processes are carried out by I/O process module 303 before starting to process an I/O command received by storage control unit 100 for determining what priority the I/O command should be treated with. For example, when a host 160 issues an I/O command directed to one of VLU1-VLU4 133, before processing the command, the storage control unit 100 determines whether a priority setting applies the volume group or frontend virtual port associated with the VLU that is the target of the command. When priority settings are applied to the volume group or frontend virtual port, storage control unit 100 determines when the particular I/O command should be processed according to the procedure set forth in FIGS. 8A-8B. FIG. 8A illustrates a flowchart for the case where priority is assigned for each volume group, while FIG. 8B illustrates the flowchart for the case where priority is assigned for each frontend virtual N_Port.

Step 801a: I/O process module 303 checks whether the volume group for which I/O command is about to be processed is a priority group or not. If it is a priority group, the process goes to step 807a. Otherwise, the process goes to step 802a.

Step 802a: I/O process module 303 checks whether there are priority volume groups on the storage control unit 100. If there are, the process goes to step 803a. Otherwise, the process goes to step 807a.

Step 803a: IOPS threshold (It) 704 and IOPS measured value (Ie) 703 of the priority volume groups found in step 801a and 802a are fetched from priority management table 306a.

Step 804a: I/O process module 303 checks whether there are any priority volume groups that were found in steps 801a and 802a, and whose IOPS measured value (Ie) 703 is greater than IOPS threshold (It) 704. If there are, the process goes to step 805a. Otherwise, the process goes to step 807a.

Step 805a: Delay setting (St) 706 and delay timer (Dt) 707 of the volume groups for which I/O command is about to be processed are fetched from priority management table 306a.

Step 806a: I/O process module 303 checks whether delay timer (Dt) 707 is greater than delay setting (St) 706. When delay timer (Dt) 707 is greater than delay setting (St) 706, the process goes to step 807a. Otherwise, the process goes to step 809a.

Step 807a: Delay timer (Dt) 707 of the volume groups for which the I/O command is about to be processed is initialized to zero.

Step 808a: I/O process module 303 returns "I/O command process OK", meaning that processing of the I/O command should be started.

Step 809a: I/O process module 303 updates delay timer (Dt) 707 of the volume groups for which I/O command is about to be processed.

Step 810a: The process returns "I/O command process NG" (no good) meaning processing of the I/O command should not be started.

Thus, Dt (delay timer) is updated until Dt becomes greater than St (delay setting). So long as Dt is less that St, the processing of an I/O command for the non-priority volume group is not started. In this way, I/O processes for non-priority volume groups are prevented from influencing the I/O performance of priority volume groups since the processing of I/O commands for non-priority volume groups are suppressed.

FIG. 8b illustrates a flowchart for an exemplary process for determining whether I/O processing should be started in the case where priority is assigned according to each frontend virtual N_Port.

Step 801b: I/O process module 303 checks whether the frontend virtual N_Port for which the I/O command is about to be processed has a priority or not. If the frontend virtual N_Port has priority, the process goes to step 807b. Otherwise, the process goes to step 802b.

Step 802b: I/O process module 303 checks whether there are priority frontend virtual N_Ports on the storage control unit 100. When there are priority frontend virtual N_Ports on the storage control unit 100, the process goes to step 803b. Otherwise, the process goes to step 807b.

Step 803b: IOPS threshold (It) 704 and IOPS measured value (Ie) 703 of the priority frontend virtual N_Ports found in step 801b and 802b are fetched from priority management table 306b.

Step 804b: I/O process module 303 checks whether there are any priority frontend virtual N_Ports that are found in step 801b and 802b, and whose IOPS measured value (Ie) 703 is greater than IOPS threshold (It) 704. When there are, the process goes to step 805b. Otherwise, the process goes to step 807b.

Step 805b: Delay setting (St) 706 and delay timer (Dt) 707 of the frontend virtual N_Port for which I/O command is about to be processed are fetched from priority management table 306b.

Step 806b: I/O process module 303 determines whether delay timer (Dt) 707 is greater than delay setting (St) 706. When Dt is greater than St, the process goes to step 807b. Otherwise, the process goes to step 809b.

Step 807b: Delay timer (Dt) 707 of the frontend virtual N_Port for which I/O command is about to be processed is initialized to zero.

Step 808b: The process returns "I/O command process OK", which indicates that processing of the I/O command should be started.

Step 809*b*: Delay timer (Dt) 707 of the frontend virtual N_Port for which I/O command is about to be processed is updated.

Step 810*b*: The process returns "I/O command process NG", which indicates that processing of the I/O command should not be started.

Dt (delay timer) is updated until Dt becomes greater than St (delay setting), and I/O processes for I/O commands to non-priority frontend virtual N_Ports are not started until Dt becomes greater than St. In this way, I/O processes for non-priority frontend virtual N_Ports are prevented from influencing the I/O performance of priority frontend virtual N_Ports by suppressing I/O processes for I/O commands directed to non-priority frontend virtual N_Ports.

Flowchart of Adjusting Delay Setting

FIG. 9A illustrates a flowchart of an exemplary process for adjusting the delay setting (St) 706 of the I/O processes of non-priority volume groups so that IOPS performance of priority volume groups will approach most closely to the target IOPS 705 of priority volume groups. This process is carried out by I/O process module 303 periodically. In this case, IOPS threshold (It) 704 and target IOPS (Io) 705 of priority volume groups, and IOPS max (Iu) 708 and IOPS min (IL) 709 of non-priority volume groups are set by administrator through service processor 140. The value of IOPS max (Iu) 708 is set to an estimated value conforming to the actual environment because the extent of the influence on the I/O processing of the priority volume groups can not be known precisely.

Step 901*a*: The value of IOPS max (Iu) 708 of non-priority volume groups are fetched from priority management table 306*a*.

Step 902*a*: The delay setting (St) 706 is calculated based on the IOPS max (Iu) 708. Here, the calculated delay setting is referred to as initial delay setting (St0) hereinafter.

Step 903*a*: The processing of I/O commands is carried out for a certain time according to the flowchart in FIG. 8A discussed above with the current delay setting (St) 706.

Step 904*a*: IOPS measured value (Ie) 703 and target IOPS (Io) 705 of priority volume groups are fetched from priority management table 306*a*.

Step 905*a*: IOPS measured value (Ie) 703 and the value of IOPS min (IL) 709 of non-priority volume groups are fetched from priority management table 306. Here, IOPS measured value 703 of non-priority volume groups is referred to as Ie' hereinafter.

Step 906*a*: I/O process module 303 checks whether there is any difference between the IOPS measured value 703 of priority volume groups (Ie) and target IOPS (Io) 705. If there is a difference, the process goes to step 907*a*. If there is not any difference, or the difference is judged to be small enough to be ignored, the process goes back to step 903*a*.

Step 907*a*: I/O process module 303 checks whether the IOPS measured value 703 of non-priority volume groups (Ie') is between IOPS max (Iu) 708 and IOPS min (IL) 709. If it is, the process goes to step 908*a*. Otherwise, the process goes back to step 903*a*.

Step 908*a*: The delay setting (St) is reset based on the formula:

$$St = St0 + a(Ie - Io) + b \int_{t0}^{t} (Ie - Io) dt$$

where a, b are coefficients, St0 is the initial delay setting value, t0 is the control start time, and t is the current time. Following resetting of the delay setting (St), the process goes back to step 903*a*.

FIG. 9B illustrates a flowchart of an alternative embodiment of a process carried out for suppressing I/O processes for non-priority volume groups below IOPS max (Iu) 708 by adjusting the delay setting (St) 706 of the I/O process of non-priority volume groups so that IOPS performance of priority volume groups will approach most closely to the target IOPS 705 of priority volume groups. This process is carried out by I/O Process Module 303 periodically, and may be used in place of the process discussed above with respect to FIG. 9A. In this case, IOPS threshold (It) 704 of priority volume groups, and IOPS max (Iu) 708 of non-priority volume groups are set by administrator through service processor 140. Target IOPS (Io) 705 and IOPS min (IL) are not used. The value of IOPS max (Iu) is set to an estimated value conforming to the actual environment because the extent of the influence on the I/O processing of the priority volume groups can not be known precisely.

Step 901*b*: the value of IOPS max (Iu) 708 of non-priority volume groups are fetched from priority management table 306.

Step 902*b*: Delay setting (St) 706 is calculated based on the IOPS max (Iu) 708. Here, the calculated delay setting is referred to as initial delay setting (St0) hereinafter.

Step 903*b*: The processing of I/O commands is carried out for a certain time according to the flowchart illustrated in FIG. 8A with the current delay setting (St) 706.

Step 904*b*: IOPS measured value (Ie) 703 of non-priority volume groups are fetched from priority management table 306. IOPS measured value 703 of non-priority volume groups is referred to as Ie' hereinafter.

Step 905*b*: I/O process module 303 checks whether there is any difference between the IOPS measured value 703 for the non-priority volume groups (Ie') and IOPS max (Iu) 708. If there is a difference, the process goes to 906*b*. If there is not any difference, or the difference is judged to be small enough to be ignored, the process goes back to step 903*a*.

Step 906*b*: The delay setting (St) is reset based on the formula:

$$St = St0 + a(Ie - Io) + b \int_{t0}^{t} (Ie - Io) dt$$

where a, b are coefficients, St0 is the initial delay setting value, t0 is the control start time, and t is the current time. Following resetting of the delay setting (St), the process goes back to step 903*b*. The same methods as illustrated in FIGS. 9A and 9B can be applied for the case where priority is set for each frontend virtual N_Port.

Second Embodiments

FIG. 10 illustrates another exemplary configuration of an information system in which the present invention may be applied. A storage system 100 is in communication with one or more host computers 1060 via a frontend SAN 1070 including one or more FC switches 1080*a*, and also in communication with a service processor 1040 and the hosts 1060 via a LAN (local area network) 1050. Storage system 100 is configured to include multiple storage control units 1000, a backend SAN 1020 including one or more backend FC switches 1080*b*, and one or more external storage control units 1030. Each storage control unit 1000 includes a CPU 1001, a memory 1002, a non-volatile random access memory (NVRAM) 1003, a cache memory 1004, a disk controller 1005, a plurality of storage mediums, such as disk drives 1006, multiple SAN interface controllers 1007, a LAN interface controller 1008, and an inter-unit network controller 1010. These components are connected to each other via an internal bus 1009. Further, while three storage control units 1000a-1000c are illustrated, the invention is not limited to any particular number of storage control units.

CPU 1001 administers the control of the storage control unit 1000, while memory 1002 stores programs and instructions executed by CPU 1001. CPU 1001 executes microprograms stored in memory 1002, so as to control disk interface controller 1005, SAN interface controller 1007, LAN interface controller 1008, and so on. Also, CPU 1001 exchanges management information and data with the other storage control units 1000 through inter-unit network controller 1010 and inter-unit network 1011 to enable the multiple storage control units 1000a-1000c to function as a single storage system. Some of the programs realizing this invention may be executed by CPU 1001, and may be stored on memory 1002 or other computer readable medium.

As discussed above with respect to the first embodiments, NVRAM 1003 can be included as a nonvolatile memory which is able to preserve management information, even when power is off. Cache memory 1004 serves to temporarily store data to be exchanged among SAN interface controllers 1007 and disk controller 1005. Disk controller 1005 exchanges data with disk drives or other suitable storage mediums 1006 in accordance with instructions from CPU 1001. CPU 1001 controls disk drives 1006 in a RAID (Redundant Array of Independent Disks) configuration (for example, RAID level 0, 1 or 5) via disk controller 1006. In the RAID configuration, multiple disk drives 1006 are managed as one group (hereinafter referred to as a RAID group). One or more logical volumes (i.e., logical units or LUs) are logically configured on each RAID group and serve as storage for the hosts 1060. An identifier referred to as an LUN (Logical Unit Number) is assigned to each logical volume. RAID configuration information is stored in NVRAM 1003, and is referred to by the CPU 1001 when CPU 1001 executes a data READ process or a data WRITE process. Additionally, it should be noted that the invention also may be configured to function without the disk controller 1005 and disk drives 1006, and the physical storage used by the storage system may be located in one or more external storage systems 1030 in communication with the multiple storage control units 1000.

One of SAN interface controllers 1007a is connected to frontend SAN 1070, and the other SAN interface controller 1007b is connected to backend SAN 1020 via optical fiber or copper wire cables, or the like. LAN interface controller 1008 is connected to host 1060 and service processor 1040 via LAN 1050. Inter-unit network controller 1010 allows CPU 1001 to exchange data and synchronize management information with CPUs 1001 on the other storage control units 1000. Storage control units 1000 are connected to each other via inter-unit network 1011 through inter-unit network controllers 1010. High-speed connection interfaces such as PCI-Express, Infiniband, etc., are desirable for use in the inter-unit communications. However, more conventional network interfaces such as Fibre Channel, Ethernet, or the like, may also be used for this interface. In such a case, a SAN interface controller 1007 or LAN interface controller 1008 may be used as inter-unit network controller 1010. In those embodiments, a SAN mediated by frontend FC switch 1080a or backend FC switch 1080b, or LAN 1050, or other network or communications link may be used as the inter-unit network 1011.

Frontend SAN 1070 establishes communication conforming to the FC-SW (Fibre Channel Switched Fabric) standard between hosts 1060 and storage control units 1000. Backend SAN 1020 mediates communication between storage control units 1000 and external storage control units 1030, conforming to the FC-SW (Fibre Channel Switched Fabric) standard. In general, a communication network established according to the FC-SW standard is referred to as a SAN (Storage Area Network). Embodiments of the invention may be arranged with one SAN serving as both frontend SAN 1070 and backend SAN 1020, as discussed above. LAN 1050 is a local area network that is structured using Ethernet or other suitable medium in which data transmission using TCP/IP is carried out. Further, in some embodiments, a WAN (wide area network), such as the Internet, might be used in place of LAN 1050.

External storage control units 1030 are connected to storage control units 1000, and are managed by the storage control units 1000. Each external storage control unit 1030 comprises the same components as storage control unit 1000. However, unlike storage control units 1000, external storage control units 1030 typically do not have a function to manage other storage control units and do not require an inter-unit network controller 1010. Some of the external storage control units 1030 may be connected to the storage control units 1000 via backend SAN 1020, as illustrated for external storage control unit 1030a, and some external storage control units 1030 may be connected directly to storage control units 1000 via a direct connection 1081, as illustrated for external storage control unit 1030b. Each of the storage control units 1000 is able to present logical volumes (or logical units, LUs) created in external storage control unit 1030 so as to appear to the hosts 1060 as storage capacity that is presented to the hosts as being logical units created inside the storage control units 1000, even though the actual storage capacity is managed by the external storage control unit 1030. Thus, these LUs are virtual LUs because they exist only virtually in the storage control unit 1000, and actually exist as LUs in the external storage control units 1030. Hereafter, such virtual logical volumes are referred to as "virtual logical units" or "VLUs". To read data from or to write data to the external storage control unit 1030, hosts 1060 issue I/O (e.g., read/write) requests to the virtual logical units on storage control units 1000, and the storage control units 1000 convert the received I/O requests into I/O requests sent to the corresponding logical volumes in the external storage control units 1030. In another arrangement, external storage control units 1030 may not exist. In that case, storage control unit 1000 provides logical volumes using the disk drives 1006 inside itself.

Hosts 1060 may be, for example, any of personal computers, work stations, mainframe computers, or the like. Hosts 1060 execute application programs such as database programs, or the like, write processing results to one of storage control units 1000 for storage in storage volumes, such as LUs or VLUs, and utilize information resources stored therein. Hosts 1060 may have a configuration that is the same as hosts 1060 illustrated in FIG. 2, as described above. Host 1060 is connected to storage control units 1000 through SAN 1070 mediated by frontend FC switch 1080a.

Service processor 1040 may have the same components as service processor 140 described above with respect to FIG. 23, and is connected to storage control units 1000 via LAN 1050. Service processor 1040 carries out, for example, configuration setting and operation information acquisition for storage control units 1000, and brings together the acquired information. An administrator executes creation of logical volumes in storage control unit 1000, allocation of logical volumes to hosts 1060, zoning, and LUN masking setting through service processor 1040. Some of the programs realizing this invention can be run on service processor 1040.

Software Modules

As illustrated in FIG. 11, in these embodiments, there are five kinds of software modules and four data structures that may be used in carrying out the invention. The software modules may be loaded into memory 1002 of each storage control unit 1000, and the data structures may be stored in NVRAM 1003 of each storage control unit 1000. Alternatively, the software modules and data structures may be stored in other computer readable mediums inside or outside the storage system. Most of the software modules are similar to those described above with respect to the first embodiments. For example, a volume group manager 1101 may be the same as volume group manager 301 in the first embodiments; a physical path manager 1102 may be the same as physical path manager 302 in the first embodiments; and an I/O process module 1103 may be the same as I/O process manager 303 in the first embodiments. The second embodiments include a transfer manager 1104 that is configured to receive instructions issued by service processor 1040 regarding transfer of virtual N_Port, VLUs, or a group of virtual N_Ports and VLUs among storage control units 1000. When transfer manager 1104 receives such an instruction, transfer manager 1104 initiates the transfer as instructed. A priority manager 1105 is configured to change settings on priority management table 304 in accordance with instructions from integrated priority manager on service processor 1040. The data structures in these embodiments include four management tables, i.e., volume group mapping table 304, physical path management table 305, and priority management table 306, as described above with respect to the first embodiments, and a unit performance table 1108, which will be described further below.

As illustrated in FIG. 12, there are four kinds of software modules and four data structures that may be used by service processor 1040. For example, the modules and data structures may be stored in memory 202 and/or storage device 203 of service processor 1040, and/or in other computer readable medium inside or outside of service processor 1040. In the illustrated embodiment, memory 202 of service processor 1040 includes an integrated volume group manager 1110, an integrated physical path manager 1111, an integrated transfer manager 1112, and an integrated priority manager 1113. Furthermore, memory 202 and/or storage device 203 of service processor 1040 may also store data structures including an integrated volume group mapping table 1113, an integrated physical path management table 1114, an integrated priority management table 1115, and an integrated unit performance table 1116.

Integrated volume group manager 1110 acquires volume group mapping tables 304 from each storage control unit 1000, and integrates them into integrated volume group mapping table 1113 in service processor 1040. Integrated physical path manager 1111 acquires physical path management table 305 from each storage control unit 1000, and integrates them into integrated physical path management table 1114 in service processor 1040.

Integrated transfer manager 1112 determines whether inter-unit network 1011 will be used after a transfer when the administrator instructs the transfer of virtual N_Ports, VLUs, or a group of virtual N_Ports and VLUs among storage control units 1000. If integrated transfer manager 1112 determines that inter-unit network 1011 will need to be used for conducting I/O operations after the transfer as instructed, integrated transfer manager 1112 presents an alternative storage control unit 1000 to the administrator as an alternative target of the transfer so that the inter-unit network 1011 will not need to be used for conducting I/O operations after the transfer.

Integrated priority manager 1113 acquires priority management tables 1107 and unit performance tables 1108 from each storage control unit 1000, and integrates them into integrated priority management table 1115 and integrated unit performance table 1116. Also, integrated priority manager 1113 changes settings on priority management table 1117 through priority manager 1105 on each storage control unit 1000 in accordance with instructions received from the administrator.

FIG. 13 is an example of a possible configuration of ports and logical volumes in these embodiments, with it being understood that numerous other configurations are also possible. The configuration of FIG. 13 is illustrated to explain further details of the invention. Physical WWPNs are provided for front end SAN interface controllers 1007a represented with a name of "WWPN_#" (where the "#" is replaced with a number), and an N_Port_ID assigned to a Physical WWPN is represented with a name of "N_Port_ID_#". Virtual WWPNs are represented with a name of "WWPN_V#", and the N_Port_ID assigned to a virtual WWPN is represented with a name of "N_Port_ID_V#". For example, SAN interface controller (N_Port) 204 on host 1060 is connected to frontend SAN 1070, and has WWPN_1 as its physical WWPN and N_Port_ID_1 assigned to it by frontend SAN 1070. Also, frontend SAN interface controller 1007a on storage control unit 1000a is connected to frontend SAN 1070, and has WWPN_2 as its physical WWPN and N_Port_ID_2 assigned to it by frontend SAN 1070. Similarly, frontend SAN interface controller 1007a on storage control unit 1000b has WWPN_3 and N_Port_ID_3, while frontend SAN interface controller 1007a on storage control unit 1000c has WWPN_4 as its physical WWPN and N_Port_ID_4. Backend SAN interface controller 1007b on storage control unit 1000a has WWPN_5 as its physical WWPN and N_Port_ID_5 assigned to it by backend SAN 1020. Similarly, backend SAN interface controller 1007b on storage control unit 1000b has WWPN_6 as its physical WWPN and N_Port_ID_6, while backend SAN interface controller 1007b on storage control unit 1000c has WWPN_7 as its physical WWPN and N_Port_ID_7. External storage control unit 1030a has SAN interface controller 1007c that has a WWPN of WWPN_8 and is assigned an N_Port_ID_8, while SAN interface controller 1007c on external control unit 1030b has a WWPN of WWPN_9 and is assigned an N_Port_ID_9.

Further, a number of virtual ports have been created. For example, storage control unit 1000a has WWPN_V1 as a virtual WWPN and N_Port_ID_V1 assigned to it by frontend SAN 1070, and also a WWPN_V2 as another virtual WWPN and N_Port_ID_V2. These virtual ports are currently associated with physical N_Port with WWPN_2. Similarly, storage control unit 1000a has WWPN_V4 as a virtual WWPN and N_Port_ID_V4 assigned to it by backend SAN 1020, and also a WWPN_V3 as another virtual WWPN and N_Port_ID_V3. These virtual ports are currently associated with physical N_Port with WWPN_5. Further, storage control unit 1000b has WWPN_V5 as a virtual WWPN and N_Port_ID_V5 assigned to it by frontend SAN 1070. This virtual port is currently associated with physical N_Port with WWPN_3.

As illustrated in FIG. 13, storage control unit 1000a has a unique ID of "Unit_1", storage control unit 1000b has a unique ID of "Unit_2", and storage control unit 1000c has a unique ID of "Unit_3". Also, it is assumed that external storage control unit 1030*a* exports four LUs 135 (LU1 to LU4) through WWPN_8 to storage control unit 1000*a*. Storage control unit 1000*a* manages and exports these LUs to host 1060 as virtual LUs 133, namely, VLU1 for LU1, VLU2 for LU2, VLU3 for LU3, and VLU4 for LU4. Additionally, VLU1 and VLU2 makeup volume Group1 1038-1, and are exported through WWPN_V1 and mapped to LU1 and LU2 using WWPN_V3. Similarly, VLU3 and VLU4 make up volume Group2 1038-2, and are exported through WWPN_V2 and mapped to LU3 and LU4 using WWPN_V4. Furthermore, volume Group3 1038-3 on storage control unit 1000*b* includes logical volumes LU11, LU12, which are created on storage control unit 100*b*.

For example, when the N_Port having WWPN_1 on host 1060 accesses data stored in LU1 on external storage control unit 1030*a*, the host 1060 sends a frame containing an I/O request with N_Port_ID_1 as S_ID 2809 and N_Port_ID_V1 as D_ID 2808. After receiving the frame, storage control unit 1000*a* sends a converted I/O request containing a frame with N_Port_ID_V3 as the S_ID and N_Port_ID_8 as the D_ID. In response to the request, external storage control unit 1030*a* returns a response including a frame with N_Port_ID_8 as the S_ID and N_Port_ID_V3 as the D_ID. After receiving the frame from external storage control unit 1030*a*, storage control unit 1000*a* sends a converted response containing a frame with N_Port_ID_V1 as the S_ID and N_Port_ID_1 as the D_ID.

Volume Group Mapping Table

FIGS. 14A-14B illustrate examples of volume group mapping tables 304-1 and 304-2 having entries corresponding to the configuration illustrated in FIG. 13. All the fields of the volume group mapping tables 304-1, 304-2 are the same as volume group mapping table 304 described above with respect to FIG. 5 in the first embodiments. The values in FIG. 14A and FIG. 14B represent the state of the volume groups on storage control unit 1000*a* and 1000*b*, respectively, as illustrated in FIG. 13.

Physical Path Management Table

FIGS. 15A-15C illustrate examples of physical path management tables 305-1-305-3, respectively, corresponding to the configuration illustrated in FIG. 13. All the fields of the physical path management tables 305-1-305-3 are the same as physical path management table 305 described above with respect to FIG. 6 in the first embodiments. The values in FIG. 15A, FIG. 15B, and FIG. 15C represent the state of the physical paths on storage control units 1000*a*, 1000*b*, 1000*c*, respectively, as illustrated in FIG. 13.

Priority Management Table

FIGS. 16A-16B and 17A-17B illustrate examples of priority management table 306 under the exemplary configuration set forth in FIG. 13. Priority can be assigned according to each volume group or each frontend virtual N_Port. Priority management tables 306*a*-1 in FIG. 16A and 306*a*-2 in FIG. 16B are examples of priority management tables in the case where priority is assigned according to each volume group. All the fields of the priority management tables 306*a*-1, 306*a*-2 are the same as the priority management table 306*a* in the first embodiment. FIG. 16A represents the state of the priority management settings for volume groups Group1 1038-1 and Group2 1038-2 on storage control unit 1000*a* illustrated in FIG. 13. FIG. 16B represent the state of the priority management settings for volume Group3 1038-3 on storage control unit 1000*b* illustrated in FIG. 13.

Priority management tables 306*b*-1 in FIG. 17A and 306*b*-2 in FIG. 17B are examples of priority management tables in the case where priority is assigned according to each frontend virtual N_Port. All the fields of the priority management table 306*b*-1, 306*b*-2 are the same as the priority management table 306*b* illustrated in FIG. 7B in the first embodiments. FIG. 17A represents the state of the priority management settings for frontend virtual N_Ports on storage control unit 1000*a* in the configuration illustrated in FIG. 13. FIG. 17B represents the state of the priority management settings for frontend virtual N_Ports on storage control unit 1000*b* in the configuration illustrated in FIG. 13.

Unit Performance Table

FIGS. 22A-22C illustrate examples of unit performance tables 1108. FIG. 22A, FIG. 22B, and FIG. 22C represent the state of the unit performance tables 1108-1, 1108-2, and 1108-3, respectively on storage control units 1000*a*, 1000*b*, and 1000*c*, respectively, as illustrated in FIG. 13. In the unit performance table, Max IOPS (Im) 2201 indicates the maximum IOPS performance that each storage control unit is capable of.

Integrated Tables on the Service Processor

As discussed above, the information of the management tables in each storage control unit may be gathered to form integrated tables on the service processor 1040. FIG. 18 illustrates an example of integrated volume group mapping table 1113. Most of the fields are the same as volume group mapping table 304; however, integrated volume group mapping table 1113 includes the field Current Unit 1801 that indicates in which storage control unit the volume group 501 currently resides. For example, as illustrated in FIG. 18, volume groups Group1 and Group2 currently reside in storage control unit "Unit_1", while volume Group3 currently resides in storage control unit "Unit_2".

FIG. 19 illustrates an example of integrated physical path management table 1114. Most of the fields are the same as physical path management table 305, discussed above with reference to FIG. 6. However, integrated physical path management table 1114 includes the field Unit 1901 that indicates in which storage control unit the physical N_Port 601 resides.

FIG. 20 illustrates an example of integrated priority management table 1115. FIG. 20A illustrates an example of integrated priority management table 1115*a* in case where priority is assigned for each volume group. Most of the fields are the same as priority management table 306*a* discussed above with reference to FIG. 7A. However, integrated priority management table 1115*a* includes the field Unit 2001 that indicates in which storage control unit the volume group 701*a* resides. Similarly, FIG. 20B illustrates an example of integrated priority management table 1115*b* in the case where priority is assigned for each frontend virtual N_Port. Most of the fields are the same as priority management table 306*b* discussed above with reference to FIG. 7B. However, integrated priority management table 1115*b* includes the field Unit 2001*b* that indicates in which storage control unit the frontend virtual N_Port 701*b* resides.

FIG. 23 illustrates an example of integrated unit performance management table 1116. Integrated unit performance management table 1116 includes the field Unit 2301, which indicates to which storage control unit the max IOPS information corresponds.

Virtual Port Transfer

FIG. 21 illustrates an example of transferring volume Group1 from storage control unit 1000*a* to storage control unit 1000*b*. The transfer involves reassigning virtual port WWPN_V1 from physical port WWPN_2 on storage control unit 1000*a* to physical port WWPN_3 on storage control unit 1000*b*, while also reassigning virtual port WWPN_V3 from physical port WWPN_5 on storage control unit 1000*a* to physical port WWPN_6 on storage control unit 1000*b*, and also mapping virtual volumes VLU1 and VLU2 at the second storage control unit 1000*b*. Thus, under this arrangement accesses from the host 1060 to LU1, for example, take placed through storage control unit 1000*b* instead of storage control unit 1000*a*. In alternative examples, for other purposes, a front end port may be transferred without transferring the entire volume group.

The details of transferring a virtual port or volume group from one storage control unit 1000 to another storage control unit 1000 are set forth in U.S. patent application Ser. No. 12/000,821, to Hara et al., filed Dec. 18, 2007, which was incorporated by reference herein above. In response to an instruction by an administrator through integrated transfer manager 1112 on service processor 1040, transfer manager 1104 on the specified storage control unit 1000 transfers a specified volume group or frontend virtual port to a specified destination storage control unit 1000. In these embodiments, transfer manager 1104 also transfers priority information of the volume group or the frontend virtual port when the transfer is carried out. This enables the transferred volume group or frontend virtual port to be treated with the same priority in the destination storage control unit.

Checking Priority Settings at Destination Storage Control Unit

After the transfer, if the destination storage control unit does not have enough performance to support the transferred volume group or frontend virtual port with the same level of priority, the target IOPS (Io) 704 cannot be achieved. This may also affect the performance of other priority volume groups or frontend virtual ports that already existed in the destination storage control unit before the transfer of the transferred volume group or frontend virtual port. Therefore, preferably before the transfer, the integrated transfer manager 1104 checks whether the destination unit has enough performance to support all the priority volumes group or frontend virtual ports after the transfer.

FIG. 24 illustrates a flowchart of an exemplary process for checking whether the destination storage control unit has enough performance to support the transfer when he transfer is specified by administrator. FIG. 24 illustrates the process carried out for the case in which priority is assigned according to each volume group, with it being understood that the process for the frontend virtual N_Ports is similar. The process may be carried out by integrated transfer manager 1112 on service processor 1040 or by one of transfer managers 1104 on one of storage control units 1000.

Step 2401*a*: The process checks whether the specified volume group has a priority setting or not. If so, the process goes to step 2402*a*. Otherwise, the process goes to step 2415*a*.

Step 2402*a*: The process checks whether there are any priority volume groups at the specified destination storage control unit. If there are, the process goes to step 2403*a*. Otherwise, the process goes to step 2415*a*.

Step 2403*a*: The process obtains the target IOPS (Io) 705 of the specified volume group and all the priority volume groups at the specified destination unit, which may be obtained from integrated priority management table 1115*a*.

Step 2404*a*: The process obtains the max IOPS (Im) 2201 of the specified destination unit from integrated unit performance management table 1116.

Step 2405*a*: The sum of all the target IOPS (Io) obtained in step 2403*a* is calculated and compared with Max IOPS (Im) 2201 obtained in step 2404*a*. If the sum is less than Max IOPS (Im) 2201, the process goes to step 2415*a*. Otherwise, the process goes to step 2406*a*.

Step 2406*a*: The process obtains Max IOPS (Im) 2201 of the storage control units other than the current storage control unit (the unit on which the specified volume group already resides) and the specified destination storage control unit.

Step 2407*a*: A check is made whether there are other units fetched in step 2406*a* having larger a Max IOPS (Im) 2201 value than the specified destination storage control unit. If there are, the process goes to step 2408*a*. Otherwise, the process goes to step 2413*a*.

Step 2408*a*: The process checks whether the storage control units meeting the condition at step 2407*a* have working paths to the same host 1060 and the same external storage control unit as the specified volume group identified for transfer. If yes, the process goes to step 2409*a*. Otherwise, the process goes to step 2413*a*.

Step 2409*a*: The process obtains the Target IOPS (Io) 705 of all the priority volume groups at the storage control units meeting the condition at step 2408*a*.

Step 2410*a*: The sum of the target IOPS (Io) 705 of the specified volume group and the priority volume groups at the storage control unit meeting the condition at step 2408*a* is calculated and compared with Max IOPS (Im) 2201. This calculation and comparison is done for each unit meeting the condition at step 2408*a*. If there are some units having larger Max IOPS (Im) 2201 than the sum of the target IOPS (Io) 705, the process goes to step 2411*a*. Otherwise, the process goes to step 2413*a*.

Step 2411*a*: The storage control units meeting the condition at step 2410*a* are illustrated to the administrator as alternate destination storage control units.

Step 2412*a*: A check is made to the administrator as to whether the transfer to the alternate storage control unit is okay. If yes, the administrator is urged to select one of the alternate storage control units, and the process goes to step 2416*a*. Otherwise, the process goes to step 2413*a*.

Step 2413*a*: A warning is illustrated to administrator that the destination storage control unit does not have sufficient performance to support all the priority volume groups if the instructed transfer is carried out.

Step 2414*a*: The process checks whether the administrator wants the transfer to the specified storage control unit to still be carried out. If yes, the process goes to step 2415*a*. Otherwise, the process goes to step 2417*a*.

Step 2415*a*: The transfer of the specified volume group to the specified destination unit is determined to be carried out.

Step 2416*a*: The transfer of the specified volume group to the alternate destination unit is determined to be carried out.

Step 2417*a*: The transfer is aborted.

The same method as set forth above can be applied for the case in which priority is set according to each frontend virtual N_Port instead of according to each volume group.

Priority Management Table and Integrated Priority Management Table after Transfer FIGS. 25A-25B and 26 illustrate examples of priority management table 306*a*-1, 306*a*-2 and integrated priority management table 1115-1, respectively, after transfer in the case where Group1 on Unit_1 is transferred to Unit_2, as illustrated in FIG. 21. These examples illustrate the case in which priority is set according to each volume group, with the tables according to virtual N_Port being similar, as discussed above. For example, FIG. 25A shows that Group1 is no longer on Unit_1, and FIG. 25B shows that Group1 is now on Unit_2 and has a priority setting. Integrated priority management table 1115-1 illustrates a similar condition.

From the foregoing it may be seen that embodiments of the present invention may be used for storage systems and storage area networks (SAN) and, in particular, storage systems having virtual ports and/or comprising multiple storage control units. Embodiments of the invention overcome issues such as that conventional priority control by each host cannot provide priority control according to each virtual machine when virtual machine software is used in a computer system. Thus, under embodiments of the invention, when a connection between a host computer and a storage system is changed, priority control on the storage system is also changed. Storage control units according to embodiments of the invention provide priority control according to each volume group or each virtual port, and also transfer priority settings when transfer of a volume group or a virtual port occurs. For example, by assigning each volume group or each virtual port to a virtual machine, as described in U.S. patent application Ser. No. 11/826,717, incorporated by reference above, and by using the method and apparatus set forth in embodiments of the invention, priority control according to each virtual machine can be achieved even when a virtual machine is transferred from one host computer to another. Also, if the connection between a host computer and a storage control unit needs to be changed to a new storage control unit, embodiments of the invention enable priority settings to be taken over to the new storage control unit.

Of course, the system configurations illustrated in FIGS. 1, 4, 10, 13 and 21 are purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for managing and controlling priority settings for volume groups and virtual ports. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A storage system comprising:
a first storage control unit in communication with a first computer via a network, said first storage control unit including a first physical port for communication with the network; and
a first storage volume created on said first storage control unit and presented to said first computer as a data storage resource, said first storage volume being accessed through said first physical port and having a first priority setting associated with said first storage volume,
wherein, when access to the first storage volume is changed from said first physical port to a second physical port in a second storage control unit, said first priority setting is transferred and applied to input/output (I/O) operations received from said first computer targeting said first storage volume received via said second physical port.

2. The storage system according to claim 1,
wherein there are a plurality of said first storage volumes created on said first storage control unit, said plurality of first storage volumes making up a first volume group, with said first priority setting associated with said first storage volumes being assigned to said first volume group.

3. The storage system according to claim 1,
wherein said first storage volume is configured as a first virtual volume created on the first storage control unit, said first virtual volume mapping to a logical volume on an external storage system in communication with said first storage control unit, whereby said external storage system provides storage capacity for said first virtual volume.

4. The storage system according to claim 1,
further including a first virtual port associated with said first storage volume, wherein the first computer accesses the first storage volume via the first virtual port,
wherein the first virtual port and the first virtual volume are included in a first volume group and said first priority setting is associated with said first volume group.

5. The storage system according to claim 4,
wherein, after access to the first storage volume is changed from said first physical port to said second physical port, said first virtual port is associated with said second physical port.

6. The storage system according to claim 1,
wherein said second physical port is located in said first storage control unit, wherein, when an I/O operation is received at said first storage control unit targeting a second volume, said first storage control unit is configured to determine whether the second volume has a priority setting, and wherein, when the second volume does not have a priority setting, and when measured I/O operations per second of the first storage volume is less than a threshold amount, the first storage control unit is configured to delay the I/O operation targeting the second volume.

7. The storage system according to claim 1, wherein, the second physical port is located in a second storage control unit, and further including a second computer in communication with said first and second storage control units, wherein, prior to changing access to the first storage volume from said first physical port to said second physical port, when there is a second priority setting associated with a second volume at the second storage control unit, said second computer is configured to determine whether a total amount of performance available at the second storage control unit is sufficient to meet a specified performance for the first storage volume plus a specified performance for the second volume.

8. The storage system according to claim 7, wherein the total amount of performance, the specified performance for the first storage volume and the specified performance for the second volume are measured according to quantities of I/O operations per second.

9. The storage system according to claim 7, wherein, when the total amount of performance available at the second storage control unit is not sufficient to meet the specified performance for the first storage volume plus the specified performance for the second volume, the second computer is configured to identify an alternate storage control unit for providing an alternate physical port to which access to the first storage volume is changed from said first physical port.

10. A storage system comprising:

a first storage control unit in communication with a first computer via a network, said first storage control unit including a first physical port for communication with the network; and a first virtual port created in correspondence with said first physical port, said first virtual port having a first priority setting associated therewith, wherein, when an input/output (I/O) operation is received at said first storage control unit targeting a second virtual port, said first storage control unit is configured to determine whether the second virtual port has a priority setting, and wherein, when the second virtual port does not have a priority setting, and when measured performance of the first virtual port is less than a threshold amount, the first storage control unit is configured to delay the I/O operation targeting the second virtual port.

11. The storage system according to claim 10, further including a first virtual volume created on the first storage control unit, said first virtual volume mapping to a logical volume on an external storage system in communication with said first storage control unit, whereby said external storage system provides storage capacity for said first virtual volume, wherein the first virtual port and the first virtual volume make up a volume group and said first priority setting is associated with said volume group, and wherein transfer of the first virtual port includes transfer of the volume group including said first virtual volume and said first virtual port.

12. The storage system according to claim 10, wherein, when transferring the first virtual port to a second physical port either in said first storage control unit or in a second storage control unit by corresponding the first virtual port with the second physical port, said first priority setting is configured to be transferred with said first virtual port and applied to communications directed to said first virtual port received at said second physical port.

13. The storage system according to claim 12, wherein, the second physical port is located in a second storage control unit, and further including a second computer in communication with the first storage control unit and the second storage control unit, wherein, prior to carrying out transfer of the first virtual port, when there is a second priority setting associated with a third virtual port at the second storage control unit, the second computer is configured to determine whether a total amount of performance available at the second storage control unit is sufficient to meet a specified performance for the first virtual port plus a specified performance for the third virtual port.

14. The storage system according to claim 13, wherein the total amount of performance, the specified performance for the first virtual port and the specified performance for the third virtual port are measured according to quantities of I/O operations per second.

15. The storage system according to claim 13, wherein, when the total amount of performance available at the second storage control unit is not sufficient to meet the specified performance for the first virtual port plus the specified performance for the third virtual port, the second computer is configured to identify an alternate storage control unit for receiving transfer of the first virtual port.

16. A method of operating a storage system comprising:

creating a plurality of first storage volumes on said first storage control unit, whereby said first storage volumes are included in a first volume group;

assigning a first priority setting to said first volume group for determining priority in processing of input/output (I/O) operations;

receiving an I/O operation at the first storage control unit targeting a second volume group;

determining whether the second volume group has a priority setting; and delaying the I/O operation targeting the second volume group when the second volume group does not have a priority setting, and when measured performance of the first volume group is less than a threshold amount.

17. The method according to claim 16, further including a step of configuring said plurality of first storage volumes as a plurality of first virtual volumes created on the first storage control unit, said first virtual volumes each mapping to a logical volume on an external storage system in communication with said first storage control unit, whereby said external storage system provides storage capacity for said plurality of first virtual volumes.

18. The method according to claim 16, further including steps of accessing said first volume group through a first physical port; and transferring the first volume group including the plurality of first storage volumes from the first physical port to a second physical port either in said first storage control unit or in a second storage control unit, wherein, following transfer, the first volume group is accessed via said second physical port, and wherein said first priority setting is transferred with said first volume group and applied to communications directed to said first volume group received at said second physical port.

19. The method according to claim 18, further including steps of providing the second physical port in a second storage control unit in communication with the first storage control unit; and prior to carrying out transfer of the first volume group, when there is a second priority setting assigned to a third volume group at the second storage control unit, determining whether a total amount of performance available at the second storage control unit is sufficient to meet a specified performance for the first volume group plus a specified performance for the third volume group.

20. The method according to claim 19, further including a step of when the total amount of performance available at the second storage control unit is not sufficient to meet the specified performance for the first volume group plus the specified performance for the third volume group, identifying an alternate storage control unit for receiving transfer of the first volume group.

* * * * *